(12) United States Patent
Lin et al.

(10) Patent No.: US 11,442,210 B2
(45) Date of Patent: Sep. 13, 2022

(54) POLARIZER SUBSTRATE AND MANUFACTURING METHOD THEREOF

(71) Applicant: Au Optronics Corporation, Hsinchu (TW)

(72) Inventors: Sheng-Kai Lin, Hsinchu (TW); Chia-Hsin Chung, Hsinchu (TW); Tsai-Sheng Lo, Hsinchu (TW); Sheng-Ming Huang, Hsinchu (TW); Ming-Jui Wang, Hsinchu (TW); Chih-Chiang Chen, Hsinchu (TW); Hui-Ku Chang, Hsinchu (TW); Cheng-Chan Wang, Hsinchu (TW); Chia-Po Lin, Hsinchu (TW); Jen-Kuei Lu, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 266 days.

(21) Appl. No.: 16/932,854

(22) Filed: Jul. 20, 2020

(65) Prior Publication Data
US 2021/0255379 A1    Aug. 19, 2021

(30) Foreign Application Priority Data
Feb. 13, 2020    (TW) .................. 109104444

(51) Int. Cl.
*G02B 5/30*   (2006.01)
*G02F 1/1335*  (2006.01)

(52) U.S. Cl.
CPC ..... *G02B 5/3058* (2013.01); *G02F 1/133536* (2013.01); *G02F 1/133548* (2021.01)

(58) Field of Classification Search
CPC ......... G02F 1/133536; G02F 1/133548; G02B 5/3058
USPC ............................................. 359/483
See application file for complete search history.

(56) References Cited

U.S. PATENT DOCUMENTS

| | | |
|---|---|---|
| 8,986,909 B2 | 3/2015 | Bae |
| 9,568,767 B2 | 2/2017 | Nam et al. |
| 9,618,793 B2 | 4/2017 | Nam et al. |
| 2014/0133027 A1* | 5/2014 | Jang .............. G02B 5/3058 359/485.03 |
| 2017/0157836 A1 | 6/2017 | Miyazawa |
| 2017/0203330 A1 | 7/2017 | Miyazawa |

* cited by examiner

*Primary Examiner* — Nathanael R Briggs
*Assistant Examiner* — William D Peterson
(74) *Attorney, Agent, or Firm* — JCIPRNET

(57) ABSTRACT

A polarizer substrate includes a substrate, a reflective layer, and a metal pattern layer. The reflective layer is located on the substrate and has a transmission area and a reflective area. The metal pattern layer is located on the reflective layer and the substrate. The metal pattern layer includes a polarizer structure and a microstructure. The polarizer structure includes a plurality of grid lines overlapping the transmission area. A thickness of each of the grid lines is 200 nm to 500 nm, a width of each of the grid lines is 30 nm to 70 nm, and a distance between each adjacent two of the grid lines is 30 nm to 70 nm. The microstructure overlaps the reflective area, and a thickness of the microstructure is 20 nm to 500 nm.

17 Claims, 20 Drawing Sheets

POLARIZER SUBSTRATE AND MANUFACTURING METHOD THEREOF

CROSS-REFERENCE TO RELATED APPLICATION

This application claims the priority benefit of Taiwan application no. 109104444, filed on Feb. 13, 2020. The entirety of the above-mentioned patent application is hereby incorporated by reference herein and made a part of this specification.

TECHNICAL FIELD

The invention relates to a polarizer substrate and a manufacturing method thereof, and more particularly, to a polarizer substrate including grid lines and a manufacturing method thereof.

BACKGROUND

A wire-grid polarizer (WGP) is a metal one-dimensional grating prepared using a nanoimprint lithography (NIL). A P wave with polarization direction perpendicular to a grating may pass through the wire-grid polarizer, and a S wave with polarization direction perpendicular to the grating may be reflected by the wire-grid polarizer. Therefore, when the wire-grid polarizer is irradiated with an unpolarized light, the P wave and the S wave in the light may be separated.

In some existing liquid crystal displays, the wire-grid polarizer is used to polarize a light ray emitted by a backlight module. However, a part of the light layer emitted by the backlight module is unable to pass through the wire-grid polarizer, and results in insufficient brightness of the liquid crystal display.

SUMMARY

The invention provides a polarizer substrate that can solve the problem of insufficient brightness.

The invention provides a manufacturing method of a polarizer substrate that can solve the problem of insufficient brightness.

An embodiment of the invention provides a polarizer substrate. The polarizer substrate includes a substrate, a reflective layer, and a metal pattern layer. The reflective layer is located on the substrate and has a transmission area and a reflective area. The metal pattern layer is located on the reflective layer and the substrate. The metal pattern layer includes a polarizer structure and a microstructure. The polarizer structure includes a plurality of grid lines overlapping the transmission area. A thickness of each of the grid lines is 200 nm to 500 nm, a width of each of the grid lines is 30 nm to 70 nm, and a distance between each adjacent two of the grid lines is 30 nm to 70 nm. The microstructure overlaps the reflective area, and a thickness of the microstructure is 20 nm to 500 nm.

An embodiment of the invention provides a manufacturing method of a polarizer substrate, which includes: forming a reflective layer on a substrate, wherein the reflective layer has a transmission area and a reflective area; forming a metal material layer overlapping the reflective area and the transmission area; and patterning the metal material layer to form a metal pattern layer. The metal pattern layer includes a polarizer structure and a microstructure. The polarizer structure includes a plurality of grid lines overlapping the transmission area. A thickness of each of the grid lines is 200 nm to 500 nm, a width of each of the grid lines is 30 nm to 70 nm, and a distance between each adjacent two of the grid lines is 30 nm to 70 nm. The microstructure overlaps the reflective area, and a thickness of the microstructure is 20 nm to 500 nm.

DETAILED DESCRIPTION

FIG. 1A to FIG. 1G are cross-sectional views of a manufacturing method of a polarizer substrate according to an embodiment of the invention.

Figure 1A:
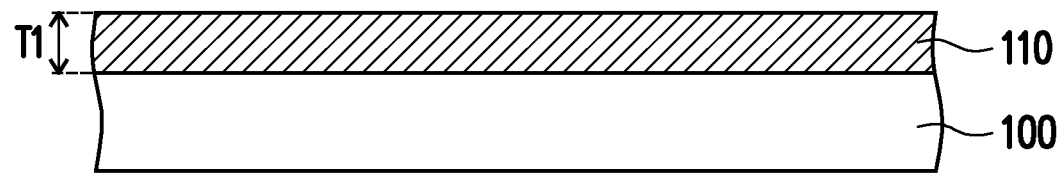
FIG. 1A to FIG. 1G are cross-sectional views of a manufacturing method of a polarizer substrate according to an embodiment of the invention.

Referring to FIG. 1A, a reflective material layer 110 is formed on a substrate 100. A material of the substrate 100 may be a glass, a quartz, an organic polymer, or other suitable materials. A material of the reflective material layer 110 may be gold, silver, copper, aluminum, molybdenum, titanium, tantalum, other metals or alloys of the metals above. In this embodiment, the reflective material layer 110 is a single-layer metal structure, a stacked layer of multiple layers of metal, or a stacked layer of metal and other materials. In the present embodiment, a thickness T1 of the reflective material layer 110 is less than or equal to 100 nm. For instance, the thickness T1 of the reflective material layer 110 is 40 nm to 100 nm.

Figure 1B:
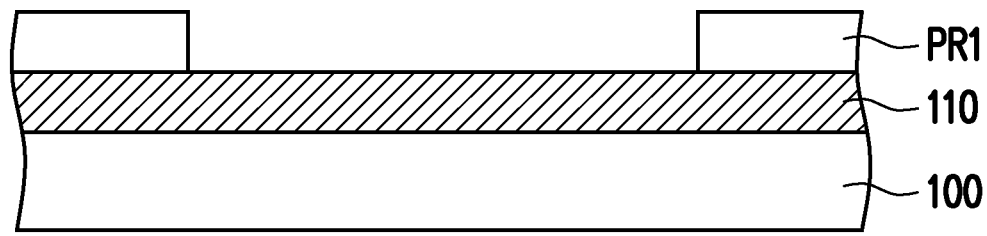

Referring to FIG. 1B, a mask pattern PR1 is formed on the reflective material layer 110. In this embodiment, the mask pattern PR1 includes a photoresistor.

Figure 1C:
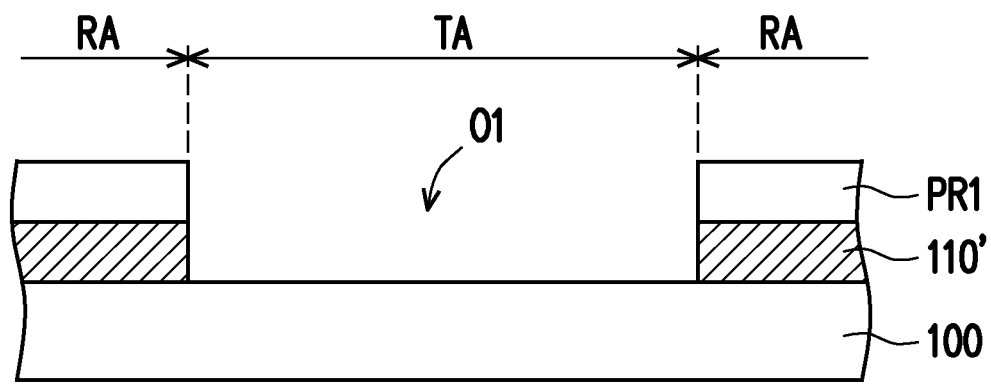

Referring to FIG. 1C, the reflective material layer 110 is etched with the mask pattern PR1 as a mask to form a reflective layer 110'. The reflective layer 110' has a transmission area TA and a reflective area RA. In this embodiment, the reflective layer 110' has an opening O1, and the opening O1 corresponds to a location of the transmission area TA.

Figure 1D:
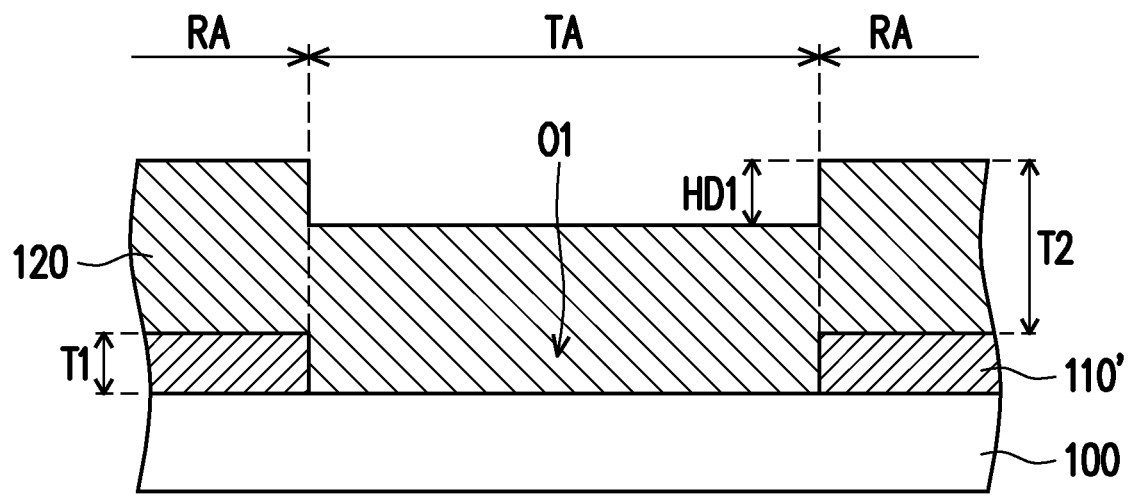

Referring to FIG. 1D, the mask pattern PR1 is removed. A metal material layer 120 overlapping the transmission area TA and the reflective area RA is formed. In this embodiment, a part of the metal material layer 120 overlapping the reflective area RA is located on the reflective area 110', and another part of the metal material layer 120 overlapping the transmission area TA is filled in the opening O1 of the reflective layer 110'. The reflective layer 110' is located between the part of the metal material layer 120 and the substrate 100.

In this embodiment, a height difference HD1 is provided between an upper surface of a part of the metal material layer 120 overlapping the transmission area TA and an upper surface of another part of the metal material layer 120 overlapping the reflective area RA. In some embodiments, the height difference HD1 is less than or equal to the thickness T1 of the reflective layer 110'. In some embodiments, a thickness T2 of the metal material layer 120 is greater than or equal to 200 nm.

In this embodiment, a material of the metal material layer 120 may be gold, silver, copper, aluminum, molybdenum, titanium, tantalum, other metals or alloys of the metals above. In this embodiment, the metal material layer 120 is a single-layer metal structure, a stacked layer of multiple layers of metal, or a stacked layer of metal and other materials. The metal material layer 120 and the reflective layer 110' have the same or different materials. In some embodiments, the metal material layer 120 and the reflective layer 110' have the same material, so that a boundary between the metal material layer 120 and the reflective layer 110' is not obvious.

Figure 1E:
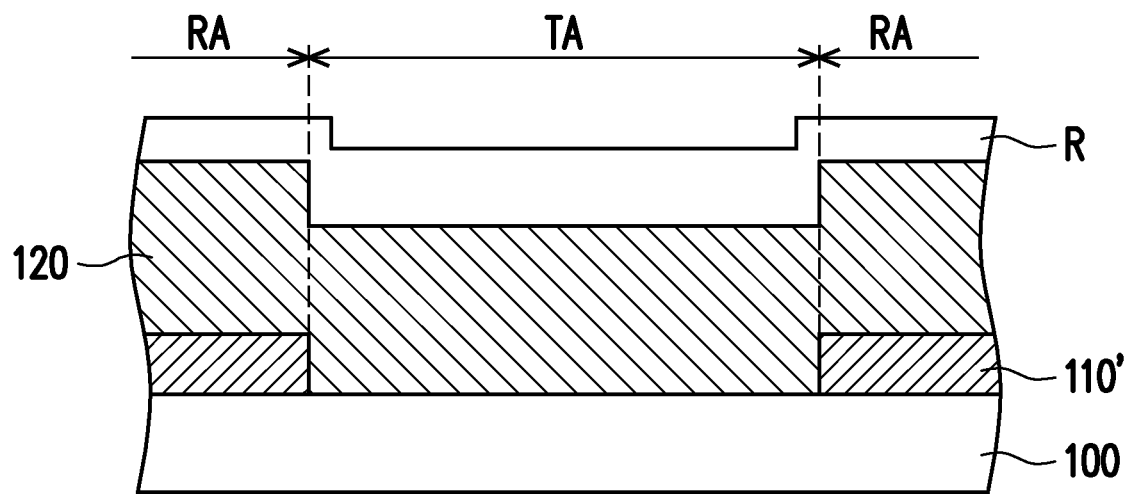
Figure 1F:
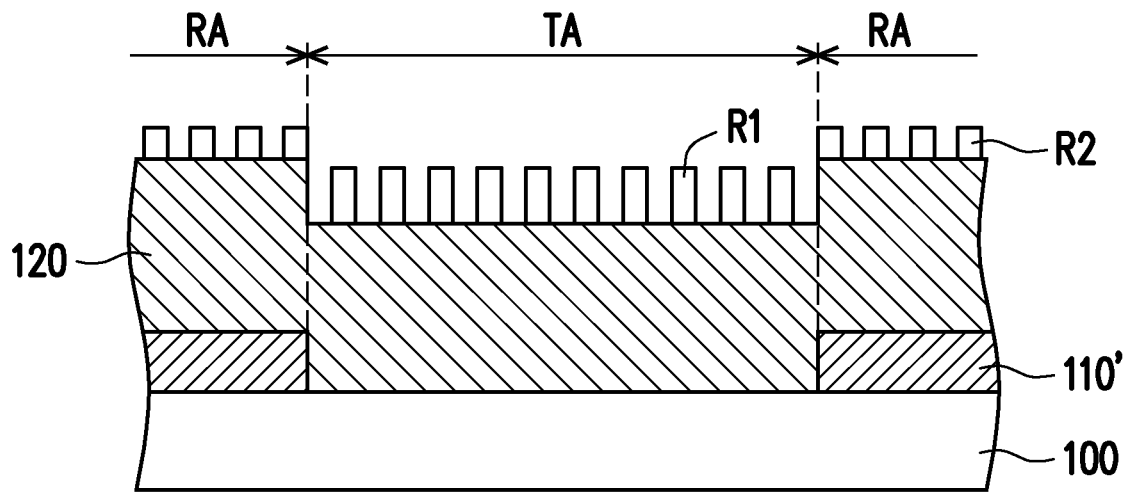
Figure 1G:
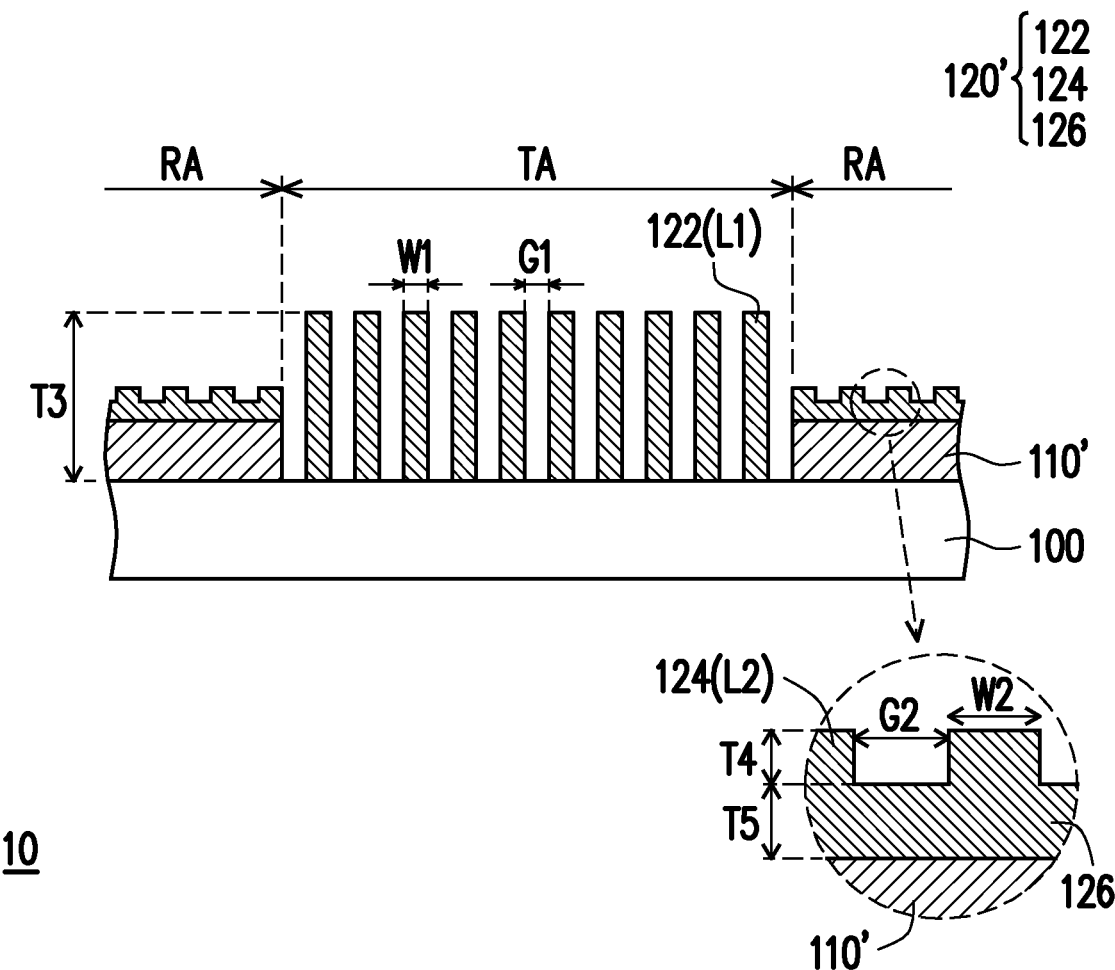

FIG. 1E to FIG. 1G are a method for patterning the metal material layer 120 of the present embodiment.

Referring to FIG. 1E, a photoresist material R is formed on the metal material layer 120. A method for forming the photoresist material R is, for example, a coating process, a printing process or other processes.

Referring to FIG. 1F, the photoresist material R is patterned by an imprinting process to form a plurality of strip photoresists (R1, R2). In this embodiment, a part of the strip photoresists (R2) overlaps the reflective area RA, and another part of the strip photoresists (R1) overlaps the transmission area TA. A height of the part of the strip photoresists (R2) overlapping the reflective area RA is different from a height of the another part of the strip photoresists (R1) overlapping the transmission area TA. In this embodiment, the height of the strip photoresist R1 is greater than the height of the strip photoresists R2.

In some embodiments, bottom portions of the adjacent strip photoresists (R1, R2) are connected to each other, but the invention is not limited thereto.

Referring to FIG. 1G, the metal material layer 120 is etched with the strip photoresists (R1, R2) as a mask to form a metal pattern layer 120'. The metal pattern layer 120' includes a polarizer structure 122 and a microstructure 124. In this embodiment, the height of the strip photoresist R1 is different from the height of the strip photoresists R2. Therefore, the metal pattern layer 120' overlapping the transmission area TA and the metal pattern layer 120' overlapping the reflective area RA have different structures. In this embodiment, the polarizer structure 122 overlaps the strip photoresists R1, and the microstructure 124 overlaps the strip photoresists R2.

The polarizer structure 122 includes a plurality of grid lines L1 overlapping the transmission area TA. A thickness T3 of each of the grid lines L1 is 200 nm to 500 nm, a width W1 of each of the grid lines L1 is 30 nm to 70 nm, and a distance G1 between each adjacent two of the grid lines L1 is 30 nm to 70 nm. In this embodiment, the polarizer structure 122 is a wire-grid polarizer (WGP).

The microstructure 124 overlaps the reflective area RA, and a thickness T4 of the microstructure 124 is 20 nm to 500 nm. In this embodiment, the microstructure 124 includes a plurality of strip structures L2. In this embodiment, the thickness T4 of the strip structures L2 is 20 nm to 50 nm. A thickness W2 of each of the strip structures L2 is 30 nm to 70 nm, and a distance G2 between each adjacent two of the strip structures L2 is 30 nm to 70 nm. In this embodiment, the width W1 is approximately equal to the width W2, and the distance G1 is approximately equal to the distance G2. In this embodiment, a pitch of the grid lines L1 is approximately equal to a pitch of the strip structures L2. In this embodiment, an extending direction of the strip structures L2 is the same as an extending direction of the grid lines L1, which is, for example, a direction into the paper surface in FIG. 1G. In this embodiment, the thickness T3 of the grid lines L1 is greater than the thickness T4 of the microstructure 124.

In this embodiment, the metal pattern layer 120' further includes an extension layer 126. The extension layer 126 is located on the reflective layer 110'. In this embodiment, the strip structures L2 are directly connected on the extension layer 126. In this embodiment, a thickness T5 of the extension layer 126 is 100 nm to 460 nm.

In this embodiment, a polarizer substrate 10 includes the substrate 100, the reflective layer 110' and the metal pattern layer 120'.

Figure 2:
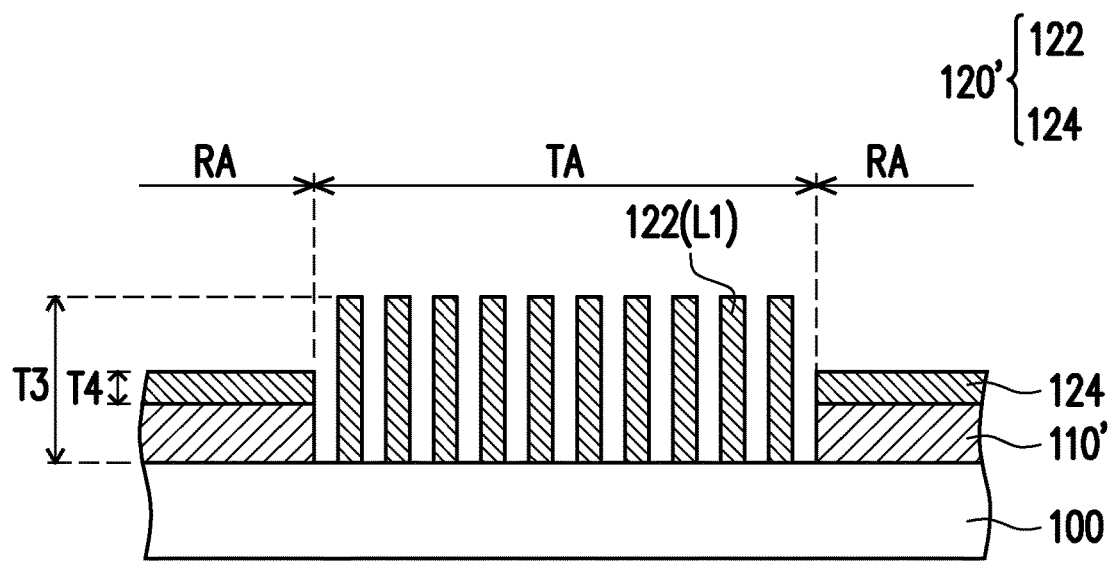
FIG. 2 is a cross-sectional view of a polarizer substrate in an embodiment of the invention.

FIG. 2 is a cross-sectional view of a polarizer substrate in an embodiment of the invention. It should be noted that, the embodiment of FIG. 2 adopts the reference numbers and part of the content in the embodiment of FIG. 1A to FIG. 1G, where identical or similar reference numbers are used to indicate identical or similar components, and repeated description for the same technical contents is omitted. For the description of the omitted parts, reference may be made to the foregoing embodiments, which will not be repeated here.

The main difference between a polarizer substrate 10a of FIG. 2 and the polarizer substrate 10 of FIG. 1G is that the microstructure 124 of the polarizer substrate 10a does not include the strip structures.

Referring to FIG. 2, in this embodiment, the microstructure 124 includes sheet structures, and the microstructure 124 is directly connected to the reflective layer 110'. In this embodiment, the thickness T4 of the microstructure 124 is 20 nm to 500 nm. The thickness T3 of the grid line L1 is greater than the thickness T4 of the microstructure 124.

Figure 3:
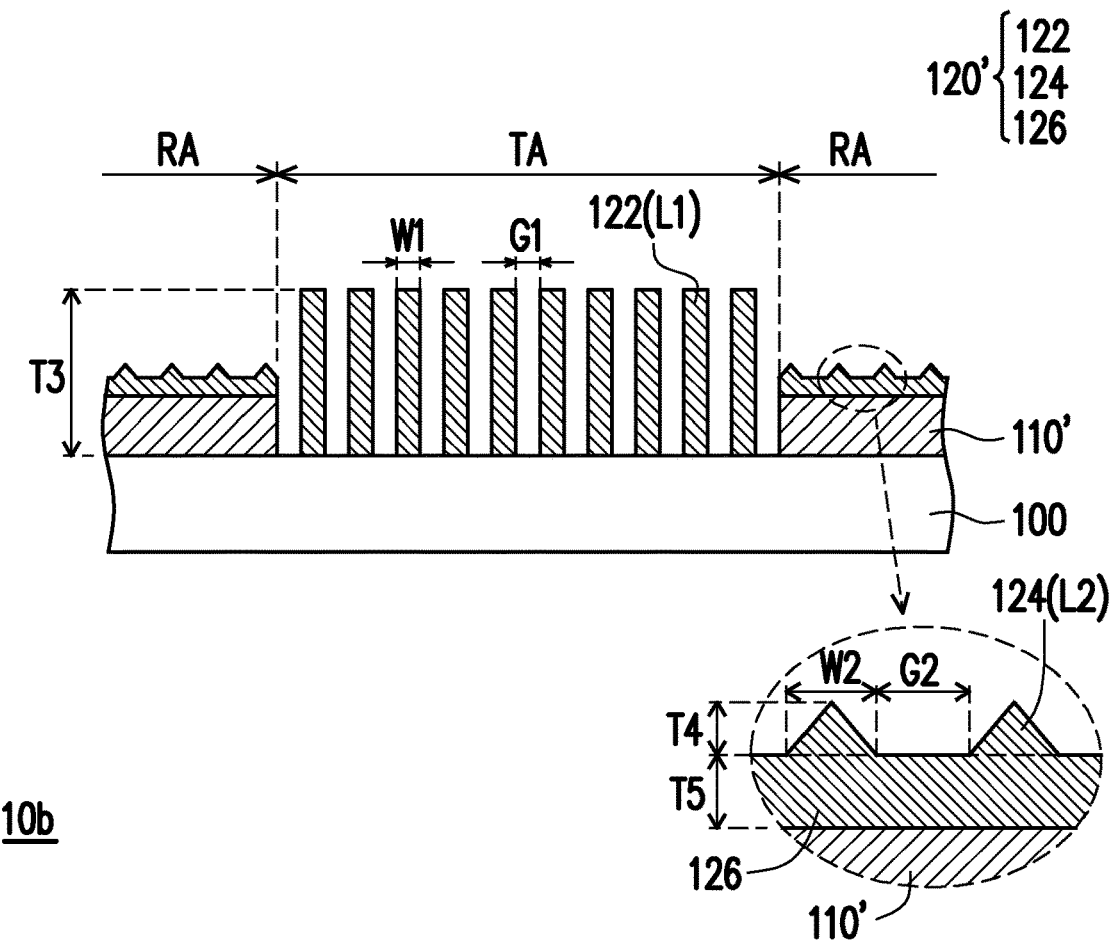
FIG. 3 is a cross-sectional view of a polarizer substrate in an embodiment of the invention.

FIG. 3 is a cross-sectional view of a polarizer substrate in an embodiment of the invention. It should be noted that, the embodiment of FIG. 3 adopts the reference numbers and part of the content in the embodiment of FIG. 1A to FIG. 1G, where identical or similar reference numbers are used to indicate identical or similar components, and repeated description for the same technical contents is omitted. For the description of the omitted parts, reference may be made to the foregoing embodiments, which will not be repeated here.

The main difference between a polarizer substrate 10b of FIG. 3 and the polarizer substrate 10 of FIG. 1G is that a top end of the strip structure L2 of the polarizer substrate 10b is sharper than a top end of the strip structure L2 of the polarizer substrate 10.

In this embodiment, the thickness T4 of the strip structures L2 is 20 nm to 50 nm. The thickness W2 of each of the strip structures L2 is 30 nm to 70 nm, and the distance G2 between each adjacent two of the strip structures L2 is 30 nm to 70 nm. In this embodiment, the width W1 is greater than or equal to the width W2, and the distance G1 is approximately less than or equal to the distance G2. In this embodiment, the pitch of the grid lines L1 is approximately equal to the pitch of the strip structures L2.

Figure 4:
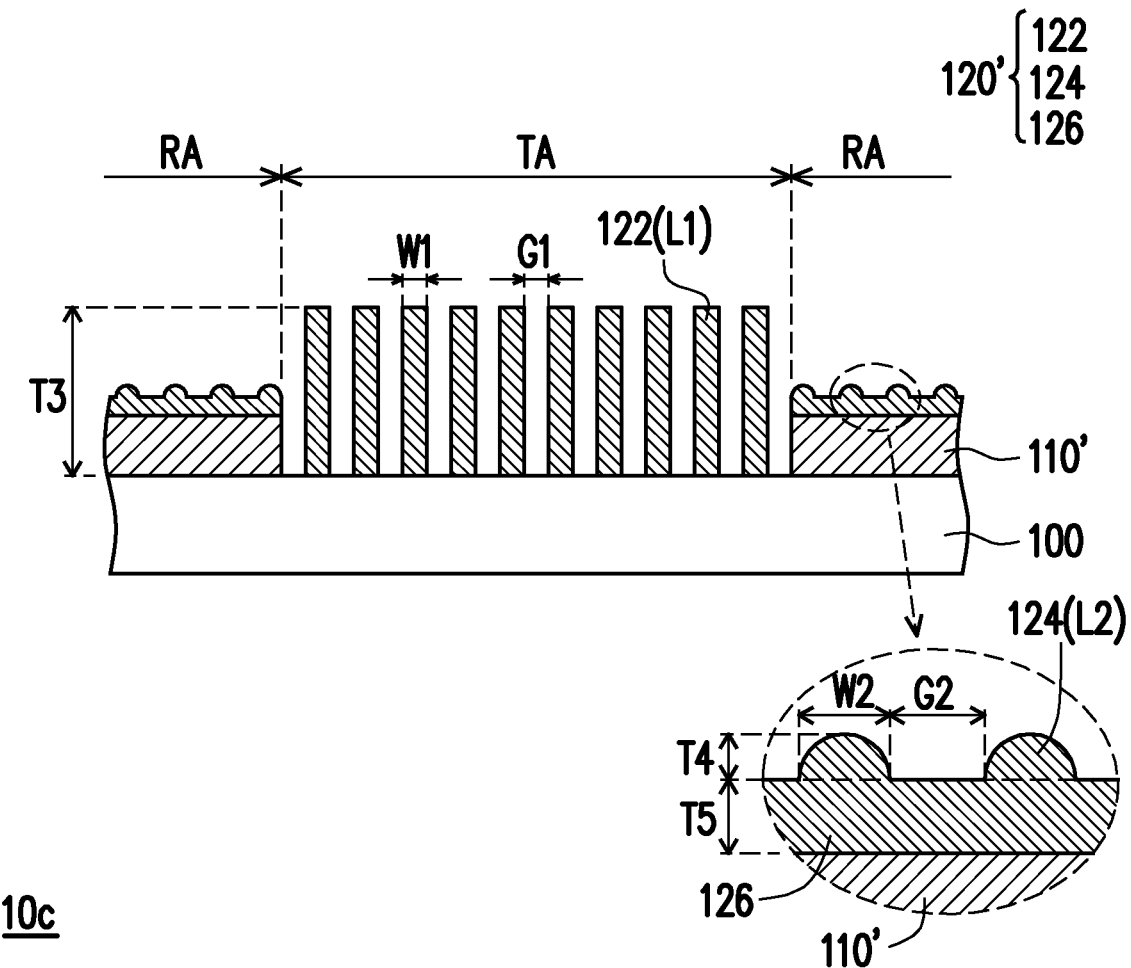
FIG. 4 is a cross-sectional view of a polarizer substrate in an embodiment of the invention.

FIG. 4 is a cross-sectional view of a polarizer substrate in an embodiment of the invention. It should be noted that, the embodiment of FIG. 4 adopts the reference numbers and part of the content in the embodiment of FIG. 1A to FIG. 1G, where identical or similar reference numbers are used to indicate identical or similar components, and repeated description for the same technical contents is omitted. For the description of the omitted parts, reference may be made to the foregoing embodiments, which will not be repeated here.

The main difference between a polarizer substrate 10c of FIG. 4 and the polarizer substrate 10 of FIG. 1G is that a top surface of the strip structure L2 of the polarizer substrate 10c is a curved surface.

In this embodiment, the thickness T4 of the strip structures L2 is 20 nm to 50 nm. The thickness W2 of each of the strip structures L2 is 30 nm to 70 nm, and the distance G2 between each adjacent two of the strip structures L2 is 30 nm to 70 nm. In this embodiment, the width W1 is equal to or greater than the width W2, and the distance G1 is approximately equal to or less than the distance G2. In this embodiment, the pitch of the grid lines L1 is approximately equal to the pitch of the strip structures L2.

Figure 5:
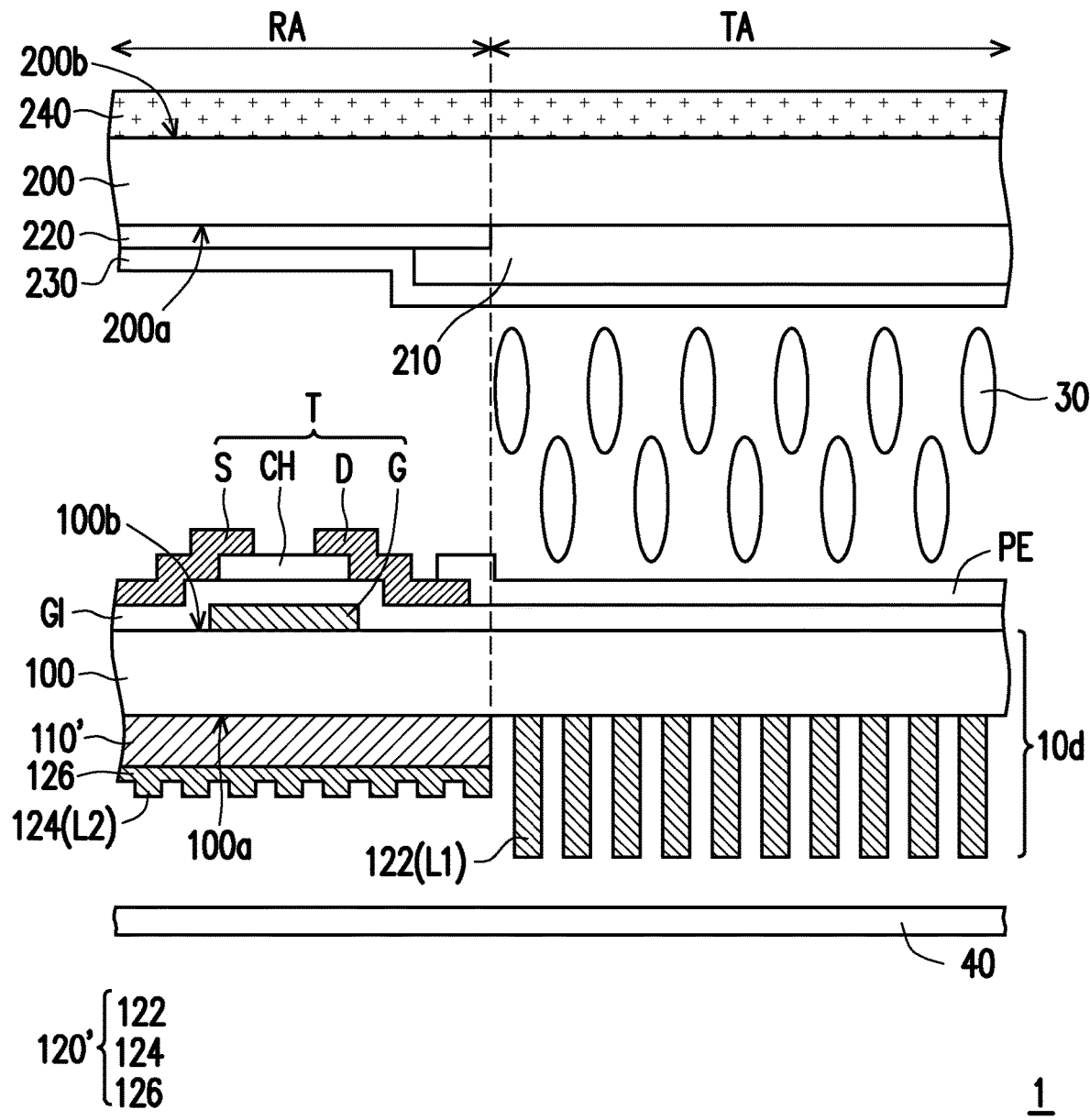
FIG. 5 is a cross-sectional view of a display device in an embodiment of the invention.

FIG. 5 is a cross-sectional view of a display device in an embodiment of the invention. It should be noted that, the embodiment of FIG. 5 adopts the reference numbers and part of the content in the embodiment of FIG. 1A to FIG. 1G, where identical or similar reference numbers are used to indicate identical or similar components, and repeated description for the same technical contents is omitted. For the description of the omitted parts, reference may be made to the foregoing embodiments, which will not be repeated here.

Referring to FIG. 5, a display device 1 includes a polarizer substrate 10d, an active element T, a pixel electrode PE, a substrate 200, a color filter element 210, a black matrix 220, a passivation layer 230, a polarizer 240, a display medium 30 and a backlight module 40. The polarizer substrate 10d is located between the substrate 200 and the backlight module 40.

The polarizer substrate 10d includes the substrate 100, the reflective layer 110' and the metal pattern layer 120'.

The reflective layer 110' is located on the substrate 100 and has the transmission area TA and the reflective area RA. The metal pattern layer 120' is located on the reflective layer 110' and the substrate 100. In this embodiment, the reflective layer 110' and the metal pattern layer 120' are located on a first surface 100a of the substrate 100. The metal pattern layer 120' includes the polarizer structure 122 and the microstructure 124 and the extension layer 126. The polarizer structure 122 includes a plurality of grid lines L1 overlapping the transmission area TA. The microstructure 124 includes the strip structures L2 overlapping the reflective area RA.

Although the microstructure 124 includes the rectangular strip structures L2 in this embodiment, the invention is not limited thereto. The microstructure 124 may also be in the form of any of the foregoing embodiments.

The active element T and the pixel electrode PE are located on the substrate 100. In this embodiment, the active element T and the pixel electrode PE are located on a second surface 100b of the substrate 100. Here, the second surface 100b is opposite to the first surface 100a. The active element T overlaps the reflective area RA, and the pixel electrode PE overlaps the transmission area TA. The active element T includes a gate G, a channel layer CH, a source S and a drain D. The gate G overlaps the channel layer CH, and a gate insulation layer GI is interposed between the gate G and the channel CH. The gate G is electrically connected to a scan line (not illustrated). The source S and the drain D are electrically connected to the channel layer CH. The source S is electrically connected to a data line (not illustrated). The drain D is electrically connected to the pixel electrode PE.

Although the active element T is a bottom gate type thin film transistor in this embodiment, the invention is not limited thereto. In other embodiments, the active element T may also be a top gate type thin film transistor or other appropriate active elements.

The display medium 30 is located between the polarizer substrate 10d and the substrate 200. The display medium 30 includes, for example, liquid crystal molecules.

The color filter element 210, the black matrix 220 and the passivation layer 230 are located on a first surface 200a of the substrate 200. The black matrix 220 overlaps the reflective area RA, and the color filter element 210 overlaps the transmission area TA. The passivation layer 230 covers the color filter element 210 and the black matrix 220. The polarizer 240 is located on a second surface 200b of the substrate 200. Here, the second surface 200b is opposite to the first surface 200a. In some embodiments, a transmission axis of the polarizer 240 is perpendicular or parallel to a transmission axis of the polarizer structure 122. The polarizer 240 includes, for example, a polyvinyl alcohol (PVA) polarizing film, a triacetate cellulose film (TAC) polarizing film, an advanced polarization conversion film (APCF), a reflective dual brightness enhancement film (DBEF) or other polarizer structures. In some embodiments, the polarizer 240 may also include a wire-grid polarizer structure.

The backlight module 40 may be a direct lit backlight module, an edge lit backlight module or other types of light sources. In this embodiment, the backlight module 40 emits the unpolarized light, and the P wave in the unpolarized light will pass through the polarizer structure 122 while the S wave is reflected by the polarizer structure 122. The light ray reflected by the polarizer structure 122 will be reflected again by the backlight module 40. Here, a part of the light ray reflected into the reflective area RA will be reflected by the microstructure 124, a part of the light ray reflected by the microstructure 124 will re-enter the transmission area TA, and a part of the S wave will return to a polarized light after being reflected and/or scattered by the microstructure 124 and/or the backlight module 40. Accordingly, the light passing through the polarizer structure 122 is increased so that the brightness of the display device 1 is also increased.

Based on the above, since the metal pattern layer 110' of the polarizer substrate 10d includes the polarizer structure 122 and the microstructure 124, the brightness of the display device 1 can be increased.

Figure 6:
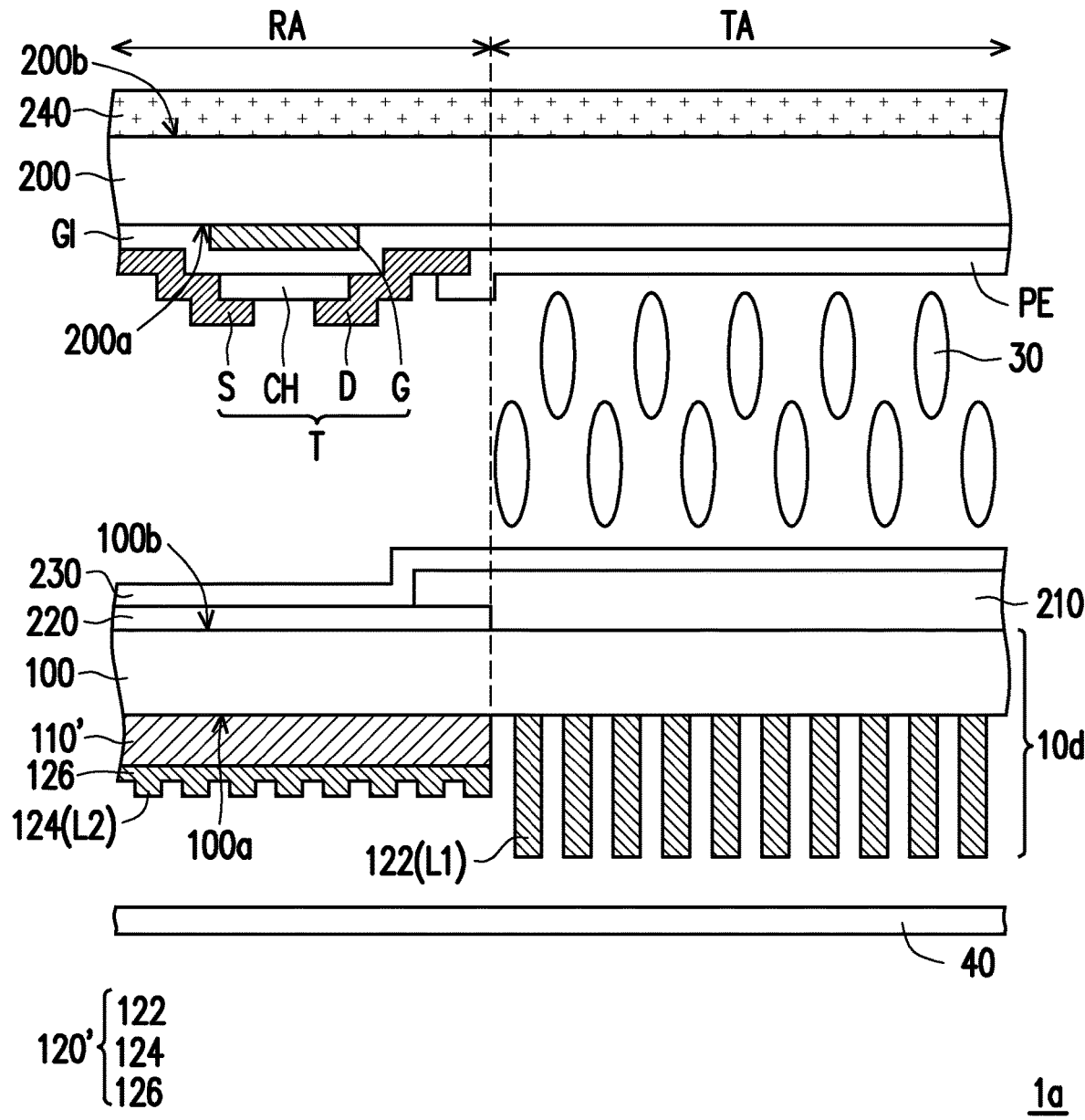
FIG. 6 is a cross-sectional view of a display device in an embodiment of the invention.

FIG. 6 is a cross-sectional view of a display device in an embodiment of the invention. It should be noted that the reference numerals and a part of the contents in the embodiment of FIG. 5 are also used to describe the embodiment of FIG. 6, in which the same reference numerals are used to represent identical or similar elements, and thus descriptions of the same technical contents are omitted. For the description of the omitted parts, reference may be made to the foregoing embodiments, which will not be repeated here.

The main difference between a display device 1a of FIG. 6 and the display device 1 of FIG. 5 is that the color filter element 210, the black matrix 220 and the passivation layer 230 of the display device 1a are located on the second surface 100b of the substrate 100.

In this embodiment, the active element T and the pixel electrode PE are located on the substrate 200. In this embodiment, the active element T and the pixel electrode PE are located on the first surface 200a of the substrate 200.

In this embodiment, the color filter element 210, the black matrix 220 and the passivation layer 230 are located on the second surface 100b of the substrate 100.

Based on the above, since the metal pattern layer 110' of the polarizer substrate 10d includes the polarizer structure 122 and the microstructure 124, the brightness of the display device 1a can be increased.

Figure 7:
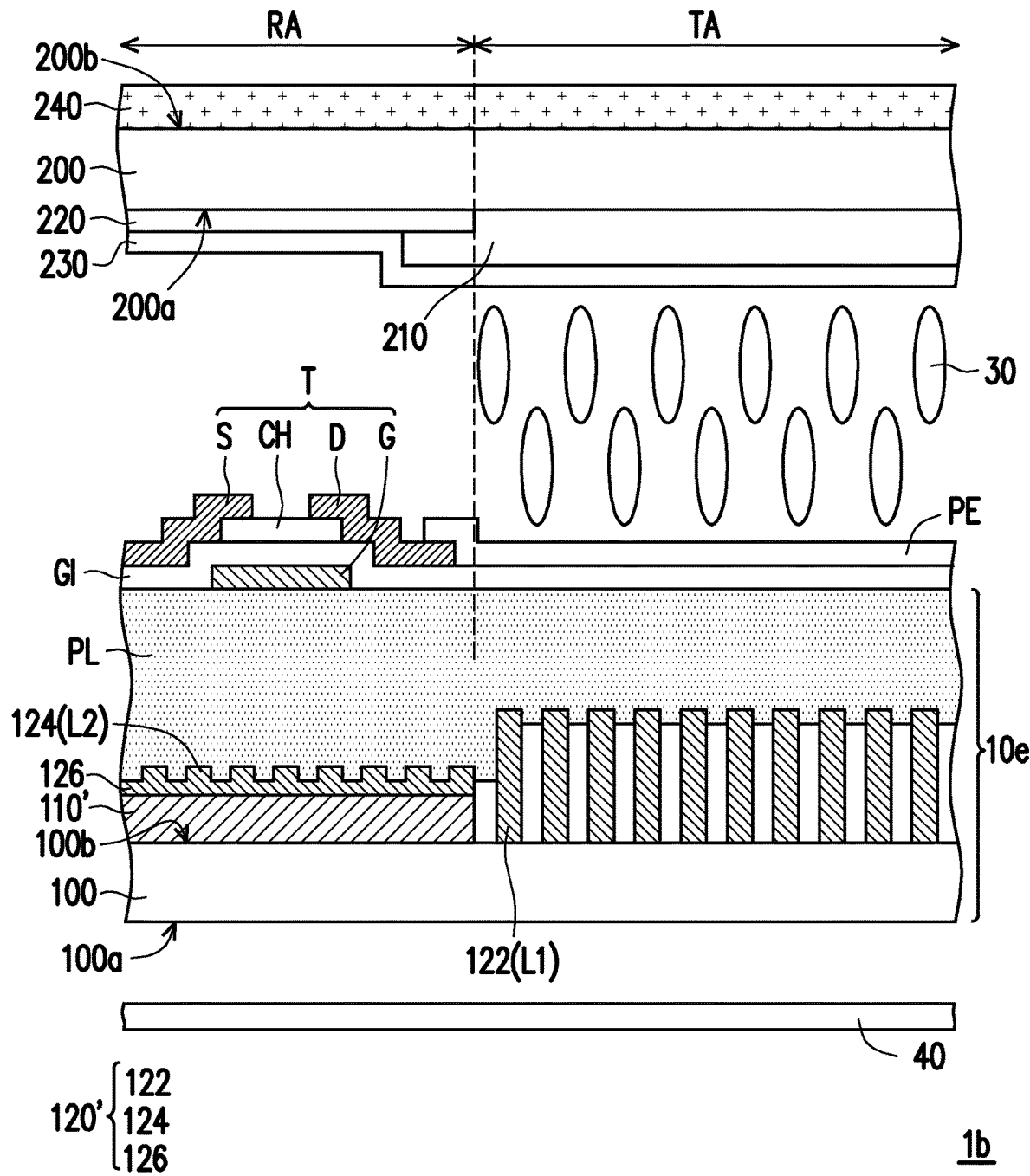
FIG. 7 is a cross-sectional view of a display device in an embodiment of the invention.

FIG. 7 is a cross-sectional view of a display device in an embodiment of the invention. It should be noted that the reference numerals and a part of the contents in the embodiment of FIG. 5 are also used to describe the embodiment of FIG. 7, in which the same reference numerals are used to represent identical or similar elements, and thus descriptions of the same technical contents are omitted. For the description of the omitted parts, reference may be made to the foregoing embodiments, which will not be repeated here.

The main difference between a display device 1b of FIG. 7 and the display device 1 of FIG. 5 is that the reflective layer 110' and the metal pattern layer 120' of a polarizer substrate 10e of the display device 1b are located on the second surface 100b of the substrate 100.

In this embodiment, the polarizer substrate 10e further includes a planar layer PL. The planar layer PL is disposed on the metal pattern layer 120'. In this embodiment, a part of the planar layer PL fills in a gap between the grid lines L1 and a gap between the strip structures L2. However, the invention is not limited in this regard.

The active element T and the pixel electrode PE are located on the planar layer PL. By setting the planar layer PL, the active element T may be prevented from being directly formed on the uneven metal pattern layer 120', so that a process yield rate of the active element T can be improved.

Based on the above, since the metal pattern layer 110' of the polarizer substrate 10e includes the polarizing structure 122 and the microstructure 124, the brightness of the display device 1b can be increased.

Figure 8:
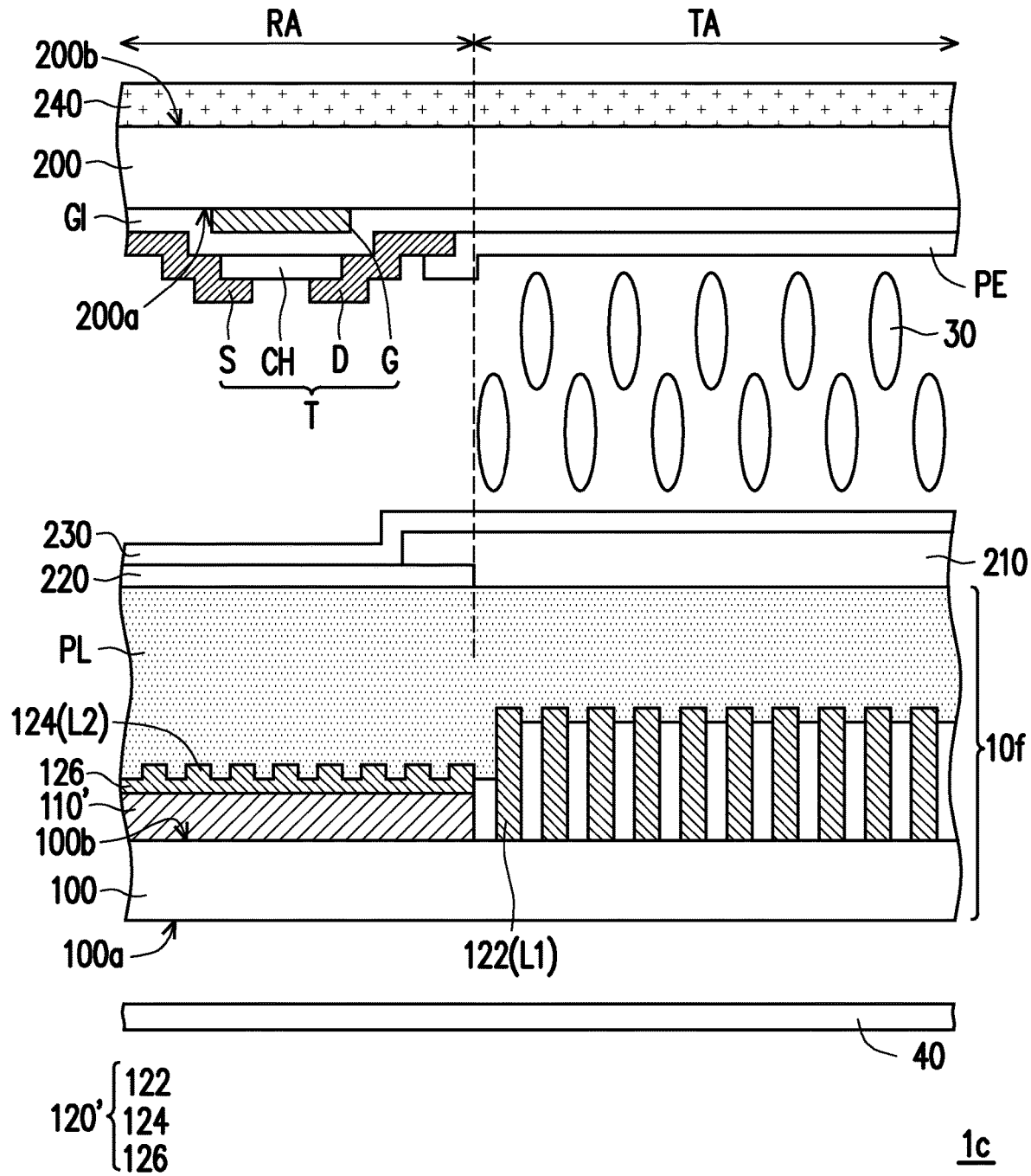
FIG. 8 is a cross-sectional view of a display device in an embodiment of the invention.

FIG. 8 is a cross-sectional view of a display device in an embodiment of the invention. It should be noted that the reference numerals and a part of the contents in the embodiment of FIG. 6 are also used to describe the embodiment of FIG. 8, in which the same reference numerals are used to represent identical or similar elements, and thus descriptions of the same technical contents are omitted. For the description of the omitted parts, reference may be made to the foregoing embodiments, which will not be repeated here.

The main difference between a display device 1c of FIG. 8 and the display device 1a of FIG. 6 is that the reflective layer 110' and the metal pattern layer 120' of a polarizer substrate 10f of the display device 1c are located on the second surface 100b of the substrate 100.

In this embodiment, the polarizer substrate 10f further includes the planar layer PL. The planar layer PL is disposed on the metal pattern layer 120'. In this embodiment, a part of the planar layer PL fills in a gap between the grid lines L1 and a gap between the strip structures L2. However, the invention is not limited in this regard.

The color filter element 210, the black matrix 220 and the passivation layer 230 are located on the planar layer PL. By setting the planar layer PL, the color filter element 210 and the black matrix 220 may be prevented from being directly formed on the uneven metal pattern layer 120', so that process yield rates of the color filter element 210 and the black matrix 220 can be improved.

Based on the above, since the metal pattern layer 110' of the polarizer substrate 10f includes the polarizer structure 122 and the microstructure 124, the brightness of the display device 1c can be increased.

FIG. 9A to FIG. 9D are cross-sectional views of a manufacturing method of a polarizer substrate according to an embodiment of the invention.

Figure 9A:
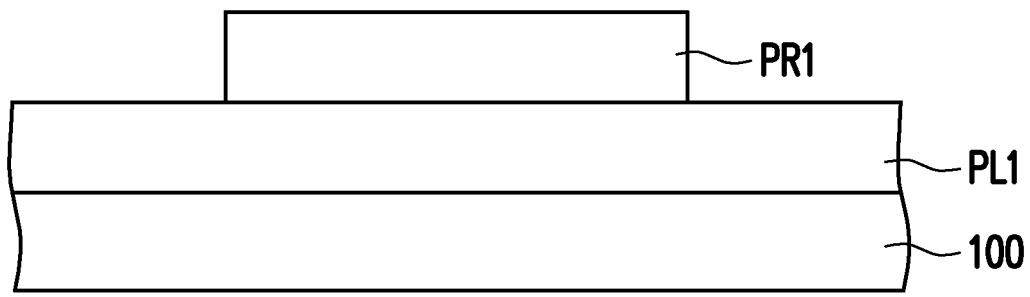
FIG. 9A to FIG. 9D are cross-sectional views of a manufacturing method of a polarizer substrate according to an embodiment of the invention.

Referring to FIG. 9A, a first planar material layer PL1 is formed on the substrate 100. A material of the substrate 100 may be a glass, a quartz, an organic polymer, or other suitable materials. A material of the first planar material layer PL1 may be silicon oxide, silicon nitride, silicon oxynitride, organic materials or other suitable materials. The mask pattern PR1 is formed on the first planar material layer PL1.

Figure 9B:

Referring to FIG. 9B, the first planar material layer PL1 is patterned with the mask pattern PR1 as a mask to form a first planar layer PL1'.

The reflective material layer 110 is formed on the substrate 100 and the first planar layer PL1'. In this embodiment, the reflective material layer 110 is formed to cover the mask pattern PR1 and the substrate 100. Here, the mask pattern PR1 is located between the first planar layer PL1' and a part of the reflective material layer 110. A material of the reflective material layer 110 may be gold, silver, copper, aluminum, molybdenum, titanium, tantalum, other metals or alloys of the metals above. In this embodiment, the reflective material layer 110 is a single-layer metal structure, a stacked layer of multiple layers of metal, or a stacked layer of metal and other materials. In the present embodiment, a thickness T1 of the reflective material layer 110 is less than or equal to 100 nm. For instance, the thickness T1 of the reflective material layer 110 is 40 nm to 100 nm.

Figure 9C:
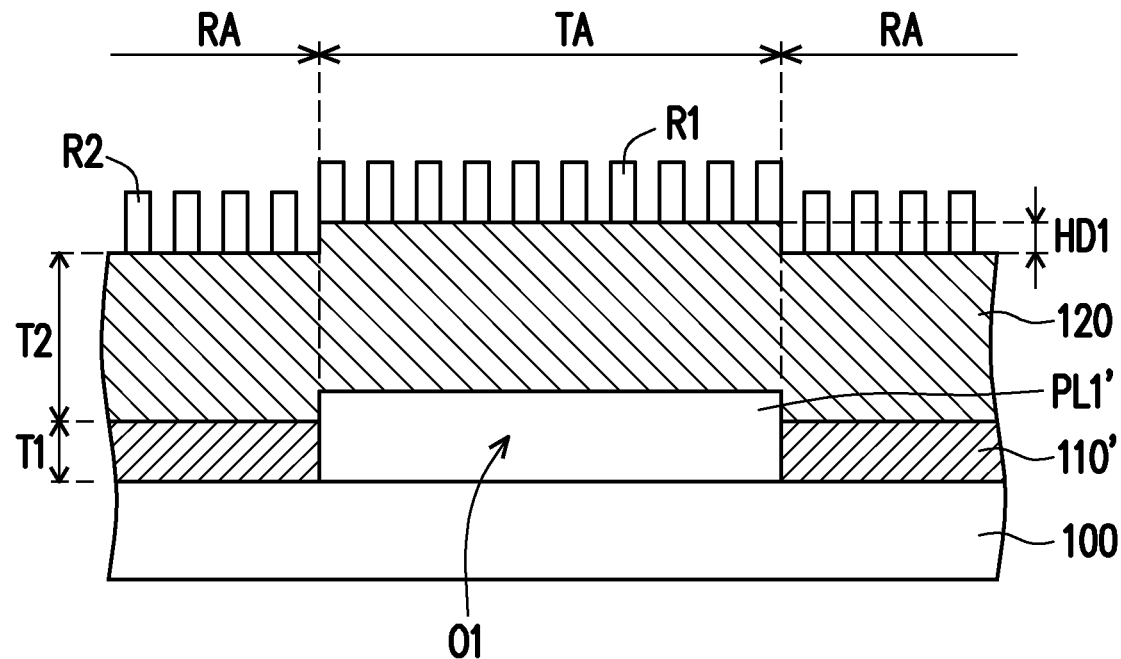

Referring to FIG. 9C, the mask pattern PR1 and a part of the reflective material layer 110 on the mask pattern PR1 are removed to form the reflective layer 110'. In this embodiment, a material of the mask pattern PR1 includes a photoresistor, and a method for removing the mask pattern PR1 and the part of the reflective material layer 110 located on the mask pattern PR1 includes a lift-off method.

The reflective layer 110' has a transmission area TA and a reflective area RA. In this embodiment, the reflective layer 110' has an opening O1, and the opening O1 corresponds to a location of the transmission area TA. The first planar layer PL1' is located in the transmission area TA, and the first planar layer PL1' is located in the opening O1 of the reflective layer 110'.

A metal material layer 120 overlapping the transmission area TA and the reflective area RA is formed. In this embodiment, a part of metal material layer 120 overlapping the reflective area RA is located on the reflective area 110', and another part of the metal material layer 120 overlapping the transmission area TA is located on the first planar layer PL1'. The reflective layer 110' is located between the part of the metal material layer 120 and the substrate 100.

In this embodiment, a height difference HD1 is provided between an upper surface of a part of the metal material layer 120 overlapping the transmission area TA and an upper surface of another part of the metal material layer 120 overlapping the reflective area RA. In some embodiments, the height difference HD1 is less than or equal to the thickness T1 of the reflective layer 110'. In this embodiment, since the first planar layer PL1' is located in the opening O1 of the reflective layer 110', the metal material layer 120 may be formed on a relatively flat surface to thereby reduce the height difference HD1. In this embodiment, a thickness of the first planar layer PL1' is greater than or equal to a thickness of the reflective layer 110'. The thickness of the first planar layer PL1' is 40 nm to 140 nm, and the thickness of the reflective layer 110' is 40 nm to 100 nm.

In this embodiment, a material of the metal material layer 120 may be gold, silver, copper, aluminum, molybdenum, titanium, tantalum, other metals or alloys of the metals above. In this embodiment, the metal material layer 120 is a single-layer metal structure, a stacked layer of multiple layers of metal, or a stacked layer of metal and other materials. The metal material layer 120 and the reflective layer 110' have the same or different materials. In some embodiments, the metal material layer 120 and the reflective layer 110' have the same material, so that a boundary between the metal material layer 120 and the reflective layer 110' is not obvious. In some embodiments, the thickness T2 of the metal material layer 120 is greater than or equal to 200 nm.

A photoresist material is formed on the metal material layer 120. A method for forming the photoresist material is, for example, a coating process, a printing process, or other processes. The photoresist material is patterned by an imprinting process to form the strip photoresists (R1, R2). In this embodiment, a part of the strip photoresists (R2) overlaps the reflective area RA, and another part of the strip photoresists (R1) overlaps the transmission area TA. In this embodiment, the height of the strip photoresist R1 is approximately equal to the height of the strip photoresists R2, but the invention is not limited thereto. In this embodiment, an upper surface of the part of the metal material layer 120 overlapping the reflective area RA protrudes from an upper surface of the another part of the metal material layer 120 overlapping the transmission area TA. Therefore, a master model used in the imprinting process can better contact the photoresist material in the transmissive area TA, so that the structure of the stripe photoresists R1 is more complete.

In some embodiments, bottom portions of the adjacent strip photoresists (R1, R2) are connected to each other, but the invention is not limited thereto.

Figure 9D:
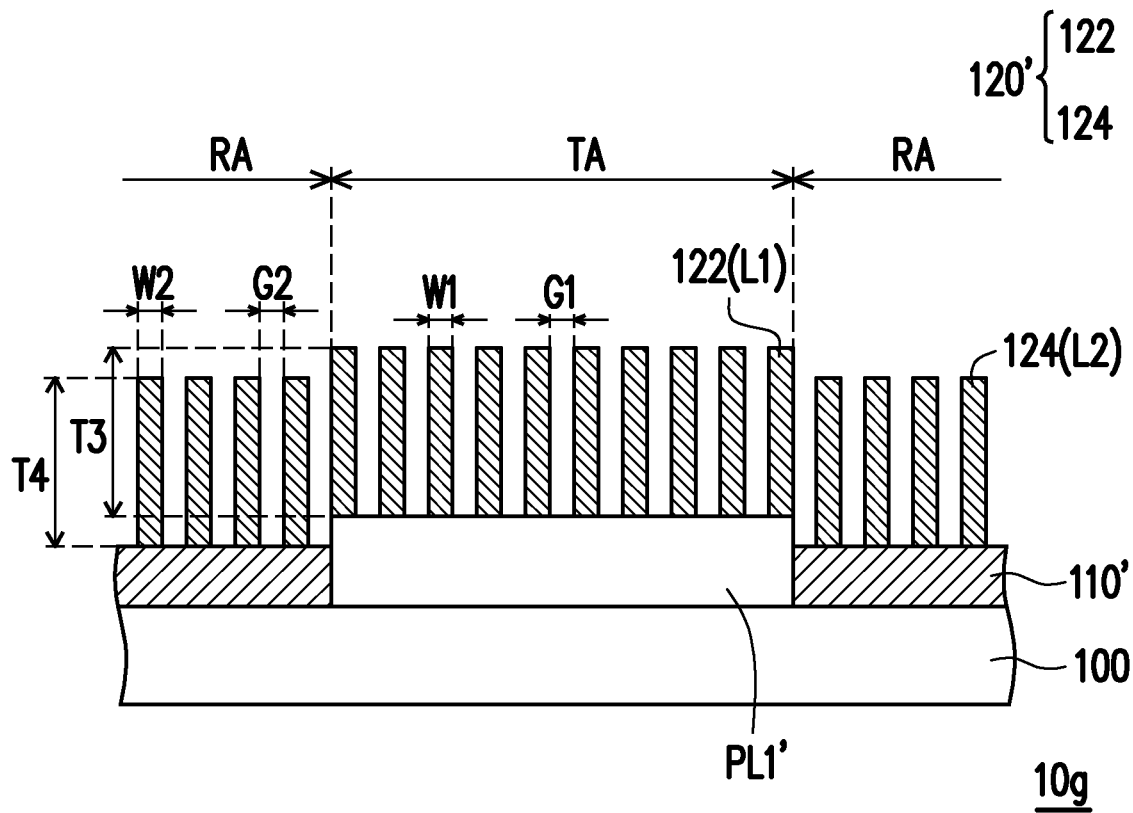

Referring to FIG. 9D, the metal material layer 120 is etched with the strip photoresists (R1, R2) as a mask to form the metal pattern layer 120'. The metal pattern layer 120' includes a polarizer structure 122 and a microstructure 124. In this embodiment, the polarizer structure 122 overlaps the strip photoresists R1, and the microstructure 124 overlaps the strip photoresists R2.

The polarizer structure 122 overlaps the first planar layer PL1' and includes the grid lines L1 overlapping the transmission area TA. The thickness T3 of each of the grid lines L1 is 200 nm to 500 nm, the width W1 of each of the grid lines L1 is 30 nm to 70 nm, and the distance G1 between each adjacent two of the grid lines L1 is 30 nm to 70 nm. In this embodiment, the polarizer structure 122 is a wire-grid polarizer (WGP).

The microstructure 124 overlaps the reflective area RA, and the microstructure 124 is directly connected to the reflective area 110. The thickness T4 of the microstructure 124 is 20 nm to 500 nm. In this embodiment, the microstructure 124 includes a plurality of strip structures L2. In this embodiment, the thickness T4 of the strip structures L2 is 20 nm to 500 nm. The thickness W2 of each of the strip structures L2 is 30 nm to 70 nm, and the distance G2 between each adjacent two of the strip structures L2 is 30 nm to 70 nm. In this embodiment, the width W1 is approximately equal to the width W2, and the distance G1 is approximately equal to the distance G2. In this embodiment, the pitch of the grid lines L1 is approximately equal to the pitch of the strip structures L2. In this embodiment, an extending direction of the strip structures L2 is the same as an extending direction of the grid lines L1, which is, for example, a direction into the paper surface in FIG. 9D. In this embodiment, the thickness T3 of the grid lines L1 is less than or equal to the thickness T4 of the microstructure 124.

In this embodiment, a polarizer substrate 10g includes the substrate 100, the first planar layer PL1', the reflective layer 110' and the metal pattern layer 120'.

Figure 10A:
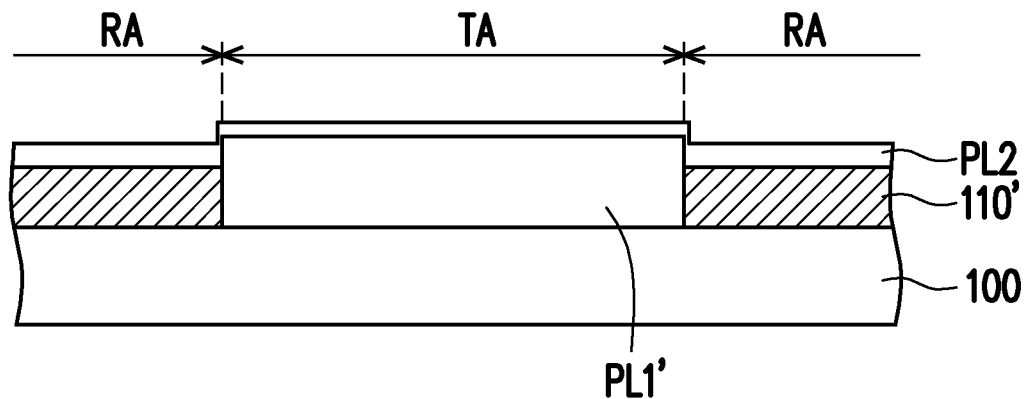
FIG. 10A to FIG. 10C are cross-sectional views of a manufacturing method of a polarizer substrate according to an embodiment of the invention.
Figure 10B:
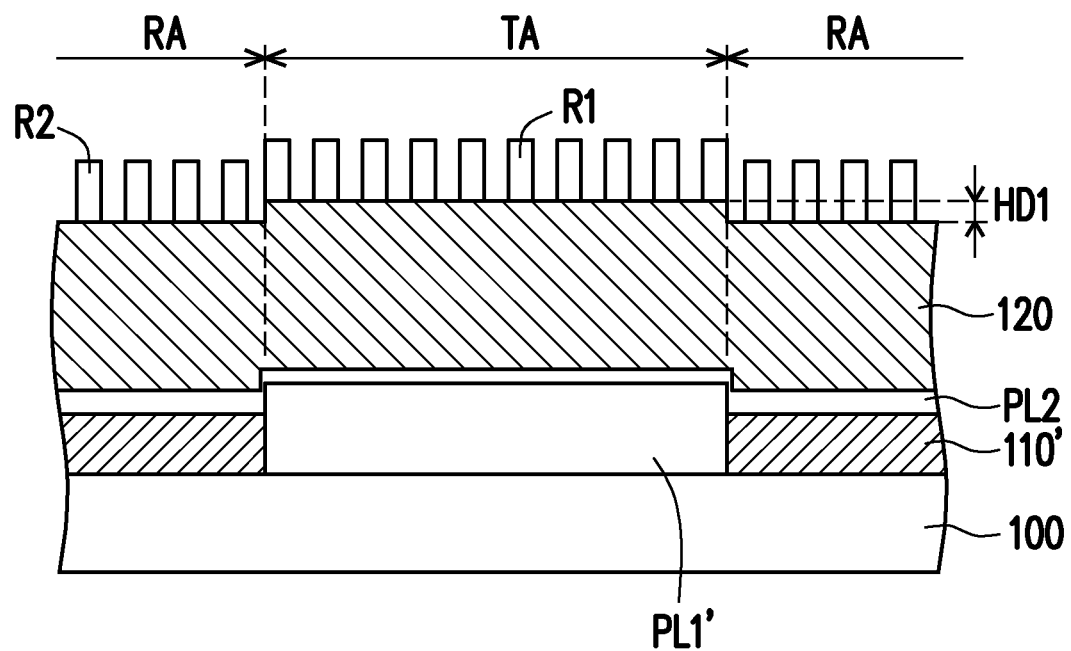
Figure 10C:
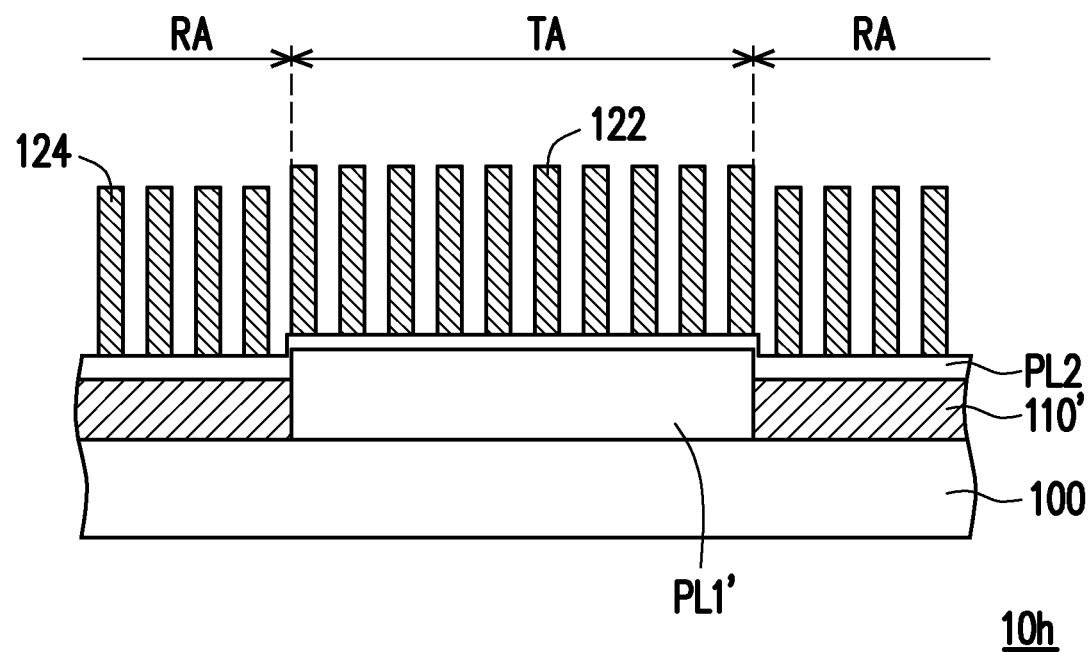

FIG. 10A to FIG. 10C are cross-sectional views of a manufacturing method of a polarizer substrate according to an embodiment of the invention. It should be noted that, the embodiment of FIG. 10A to FIG. 10C adopts the reference numbers and part of the content in the embodiment of FIG. 9A to FIG. 9D, where identical or similar reference numbers are used to indicate identical or similar components, and repeated description for the same technical contents is omitted. For the description of the omitted parts, reference may be made to the foregoing embodiments, which will not be repeated here.

Referring to FIG. 10A, after the mask pattern PR1 and the part of the reflective material layer 110 located on the mask pattern PR1 (illustrated in FIG. 9B) are removed, a second planar layer PL2 is formed to cover the reflective layer 110' and the first planar layer PL1'. The second planar layer PL2 overlaps the reflective area RA and the transmission area TA. In this embodiment, a thickness of the second planar layer PL2 located on the first planar layer PL1' is less than a thickness of the second planar layer PL2 located on the reflective layer 110'. The thickness of the second planar layer PL2 is less than the thickness of the first planar layer PL1'. In this embodiment, a material of the second planar layer PL2 may be silicon oxide, silicon nitride, silicon oxynitride, organic materials or other suitable materials.

Referring to FIG. 10B, the metal material layer 120 overlapping the transmission area TA and the reflective area RA is formed. In this embodiment, the metal material layer 120 is formed on the second planar layer PL2.

In this embodiment, a height difference HD1 is provided between an upper surface of a part of the metal material layer 120 overlapping the transmission area TA and an upper surface of another part of the metal material layer 120 overlapping the reflective area RA. In some embodiments, the second planar layer PL2 may further reduce the height difference HD1.

A photoresist material is formed on the metal material layer 120. A method for forming the photoresist material is, for example, a coating process, a printing process, or other processes. The photoresist material is patterned by an imprinting process to form the strip photoresists (R1, R2). In this embodiment, a part of the strip photoresists (R2) overlaps the reflective area RA, and another part of the strip photoresists (R1) overlaps the transmission area TA.

Referring to FIG. 10C, the metal material layer 120 is etched with the strip photoresists (R1, R2) as a mask to form the metal pattern layer 120'. The metal pattern layer 120' includes a polarizer structure 122 and a microstructure 124. In this embodiment, the polarizer structure 122 overlaps the strip photoresists R1, and the microstructure 124 overlaps the strip photoresists R2.

The polarizer structure 122 overlaps the first planar layer PL1' and is directly connected on the second planar layer PL2. The polarizer structure 122 includes a plurality of grid lines L1 overlapping the transmission area TA. In this embodiment, the polarizer structure 122 is a wire-grid polarizer.

The microstructure 124 overlaps the reflective area RA, and the microstructure 124 is directly connected to the second planar layer PL2. In this embodiment, the microstructure 124 includes a plurality of strip structures L2.

In this embodiment, a polarizer substrate 10h includes the substrate 100, the first planar layer PL1', the second planar layer PL2, the reflective layer 110' and the metal pattern layer 120'.

FIG. 11A to FIG. 11E are cross-sectional views of a manufacturing method of a polarizer substrate according to an embodiment of the invention. It should be noted that, the embodiment of FIG. 11A to FIG. 11E adopts the reference numbers and part of the content in the embodiment of FIG. 9A to FIG. 9D, where identical or similar reference numbers are used to indicate identical or similar components, and repeated description for the same technical contents is omitted. For the description of the omitted parts, reference may be made to the foregoing embodiments, which will not be repeated here.

Figure 11A:
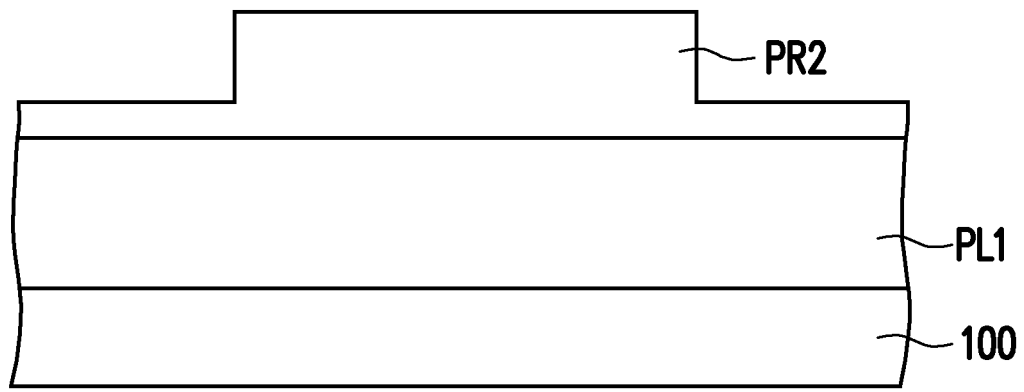
FIG. 11A to FIG. 11E are cross-sectional views of a manufacturing method of a polarizer substrate according to an embodiment of the invention.
Figure 11B:
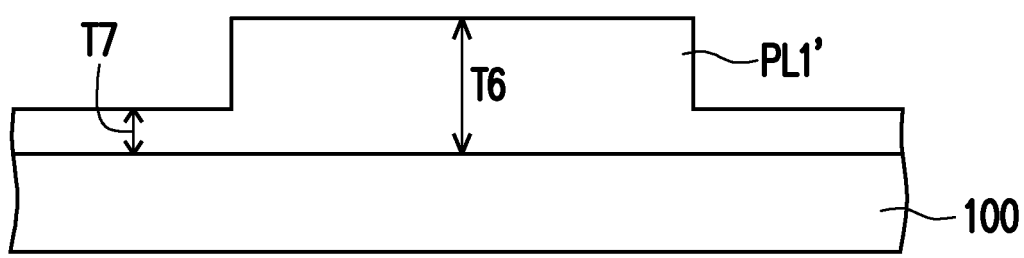

Referring to FIG. 11A and FIG. 11B, the first planar material layer PL1 is formed on the substrate 100. A first mask pattern PR2 is formed on the first planar material layer PL1 by a half-tone mask process. The first planar material layer PL1 is patterned with the first mask pattern PR2 to form the first planar layer PL1'. In this embodiment, the first planar layer PL1' includes a part having a thickness T6 and a part having a thickness T7, and the thickness T6 is greater than the thickness T7. In some embodiments, after the first planar layer PL1' is formed, the first mask pattern PR2 is removed.

Figure 11C:
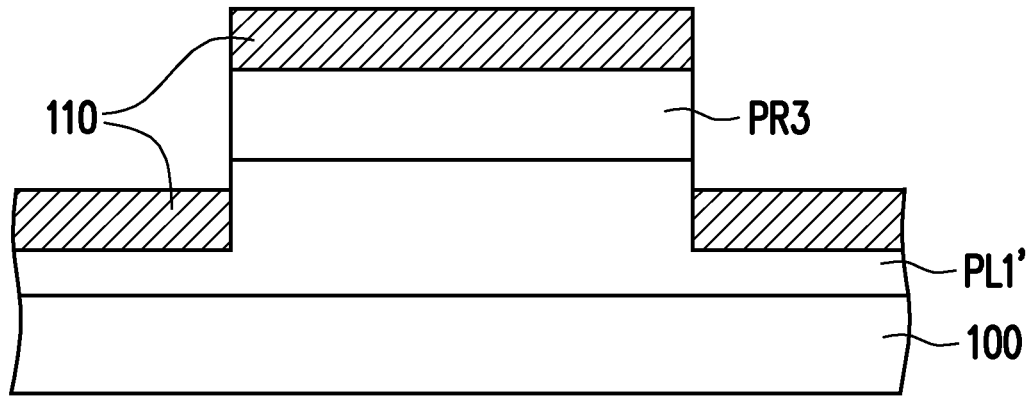

Referring to FIG. 11C, a second mask pattern PR3 is formed on the first planar layer PL1'. In this embodiment, the second mask pattern PR3 is formed on the part of the first planar layer PL1' having the thickness T6. The reflective material layer 110 is formed to cover the second mask pattern PR3 and the first planar layer PL1'.

Figure 11D:
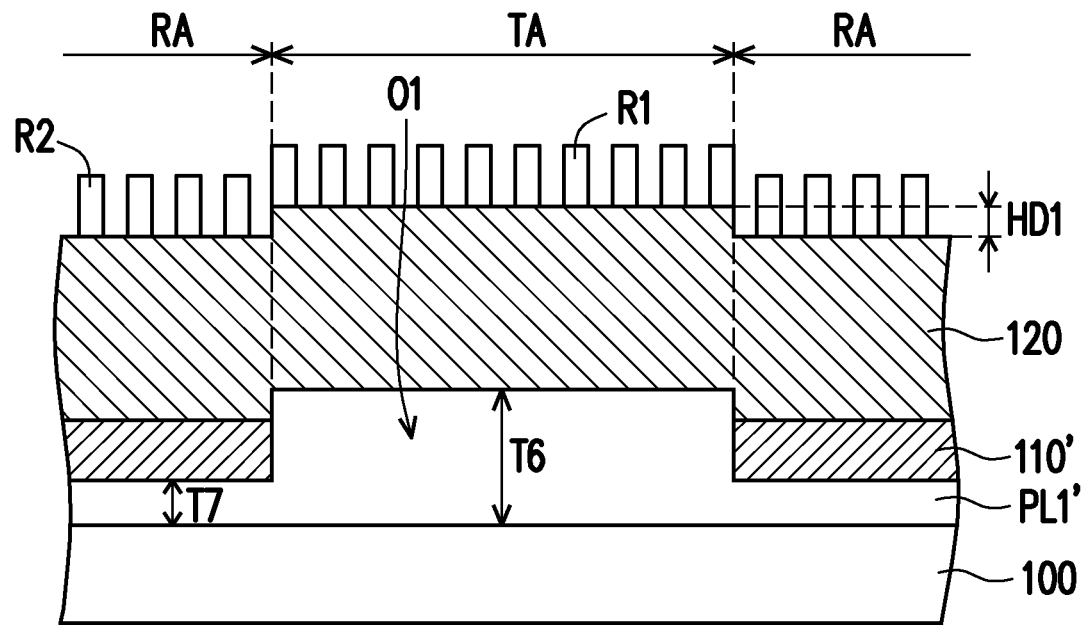

Referring to FIG. 11D, the second mask pattern PR3 and a part of the reflective material layer 110 on the second mask pattern PR3 are removed to form the reflective layer 110'. In this embodiment, the part of the first planar layer PL1' having the thickness T7 is located between the substrate 100 and the reflective layer 110'. The part of the first planar layer PL1' having the thickness T6 is located in the opening O1 of the reflective layer 110'.

A metal material layer 120 overlapping the transmission area TA and the reflective area RA is formed. In this embodiment, a part of metal material layer 120 overlapping the reflective area RA is located on the reflective area 110', and another part of the metal material layer 120 overlapping the transmission area TA is located on the first planar layer PL1'. The reflective layer 110' is located between the part of the metal material layer 120 and the first planar layer PL1'.

In this embodiment, a height difference HD1 is provided between an upper surface of a part of the metal material layer 120 overlapping the transmission area TA and an upper surface of another part of the metal material layer 120 overlapping the reflective area RA. In some embodiments, the part of the first planar layer PL1' having the thickness T6 may reduce or eliminate the height difference HD1.

A photoresist material is formed on the metal material layer 120. A method for forming the photoresist material is, for example, a coating process, a printing process, or other processes. The photoresist material is patterned by an imprinting process to form the strip photoresists (R1, R2). In this embodiment, a part of the strip photoresists (R2) overlaps the reflective area RA, and another part of the strip photoresists (R1) overlaps the transmission area TA. In some embodiments, bottom portions of the adjacent strip photoresists (R1, R2) are connected to each other, but the invention is not limited thereto.

Figure 11E:
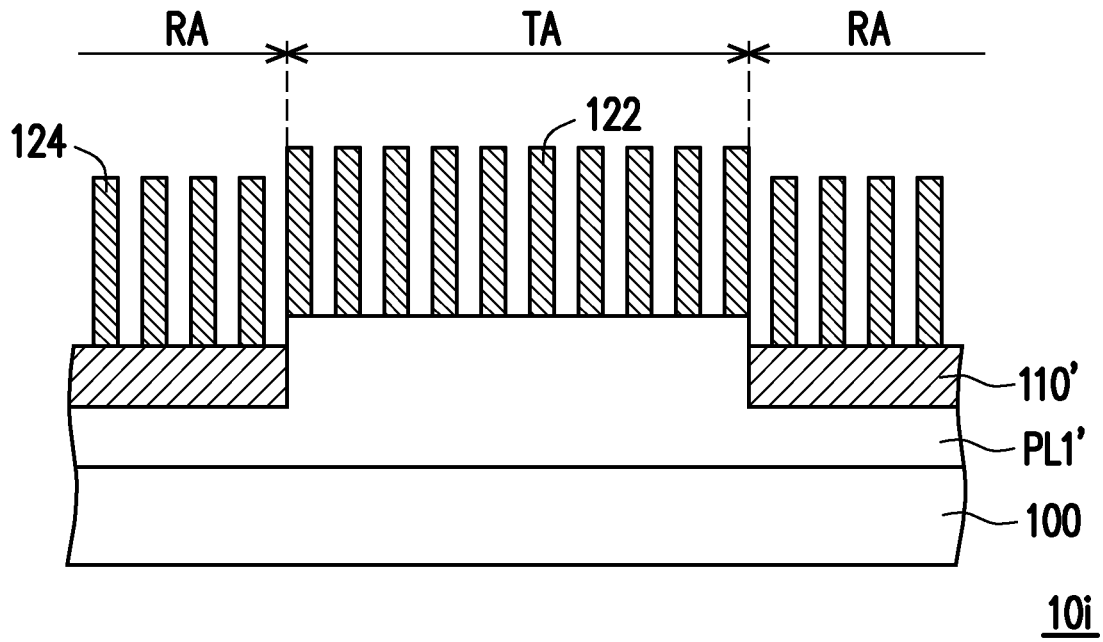

Referring to FIG. 11E, the metal material layer 120 is etched with the strip photoresists (R1, R2) as a mask to form the metal pattern layer 120'. The metal pattern layer 120' includes a polarizer structure 122 and a microstructure 124.

In this embodiment, a polarizer substrate 10i includes the substrate 100, the first planar layer PL1', the reflective layer 110' and the metal pattern layer 120'.

Figure 12:
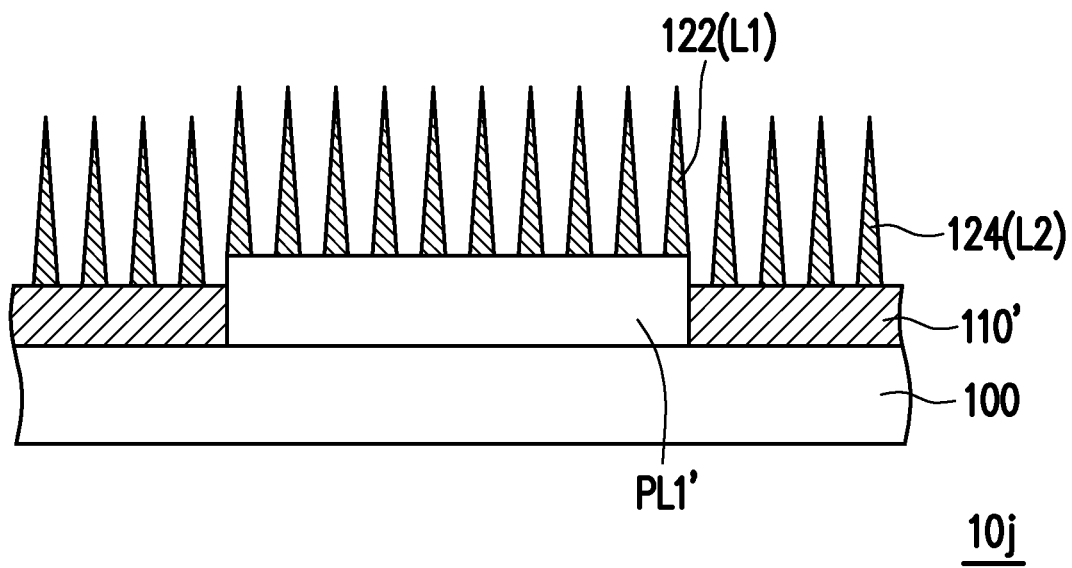
FIG. 12 is a cross-sectional view of a polarizer substrate in an embodiment of the invention.

FIG. 12 is a cross-sectional view of a polarizer substrate according to an embodiment of the invention. It should be noted that the reference numerals and a part of the contents in the embodiment of FIG. 9D are also used to describe the embodiment of FIG. 12, in which the same reference numerals are used to represent identical or similar elements, and thus descriptions of the same technical contents are omitted. For the description of the omitted parts, reference may be made to the foregoing embodiments, which will not be repeated here.

The main difference between a polarizer substrate 10j of FIG. 12 and the polarizer substrate 10g of FIG. 9D is that in the polarizer substrate 10j, a width of each of the stripe structures L2 closer to the substrate 100 is wider, and a width of each of the grid line L1 closer to the substrate 100 is wider.

In this embodiment, sidewalls of the strip structures L2 and the grid lines L1 are inclined surfaces. By increasing an etching time when patterning the metal pattern layer, the stripe structures L2 and the grid lines L1 can have the inclined sidewalls to thereby increase a reflected light at a large angle.

Figure 13:
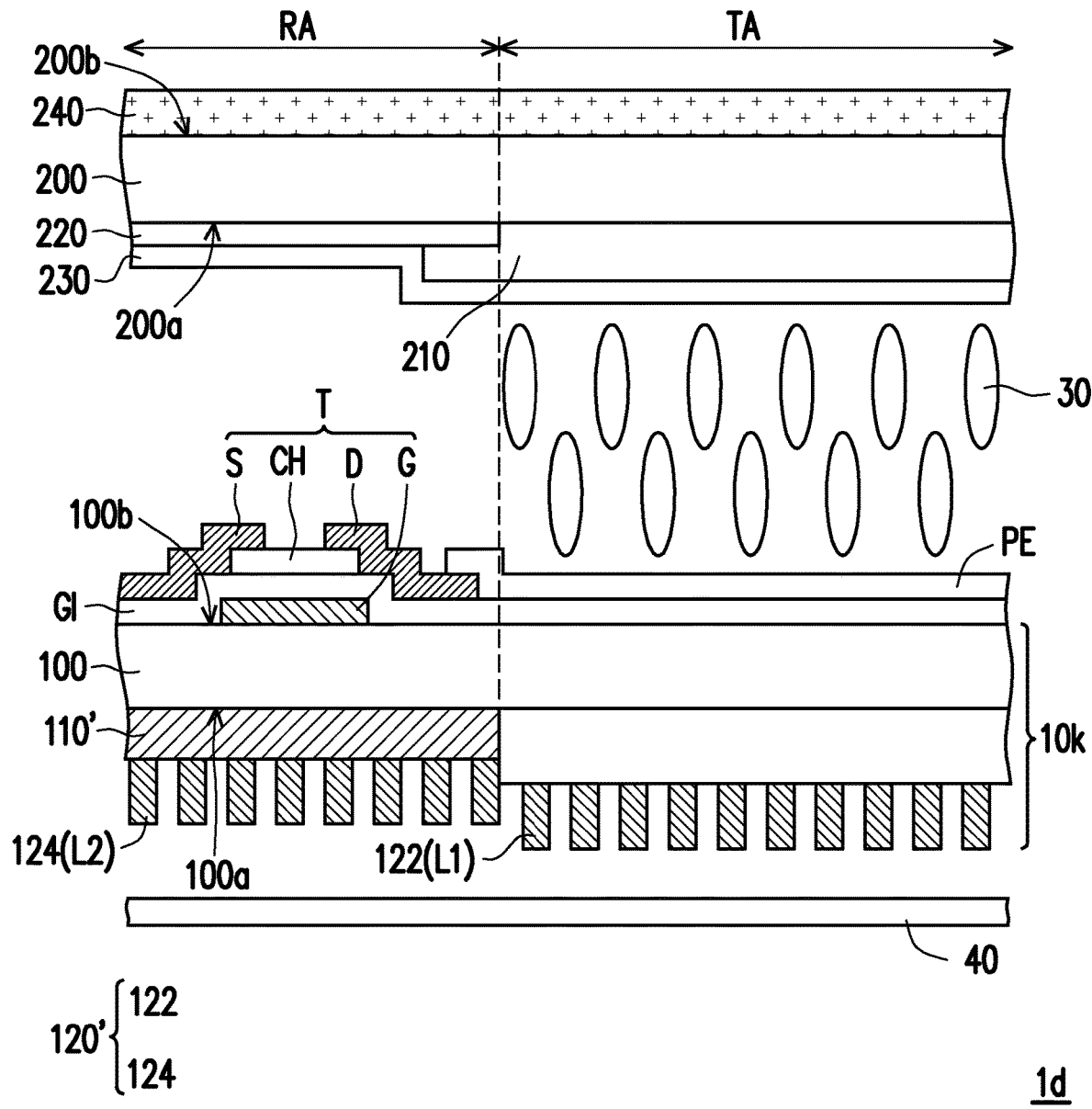
FIG. 13 is a cross-sectional view of a display device in an embodiment of the invention.

FIG. 13 is a cross-sectional view of a display device in an embodiment of the invention. It should be noted that, the embodiment of FIG. 13 adopts the reference numbers and part of the content in the embodiment of FIG. 9A to FIG. 9D, where identical or similar reference numbers are used to indicate identical or similar components, and repeated description for the same technical contents is omitted. For the description of the omitted parts, reference may be made to the foregoing embodiments, which will not be repeated here.

Referring to FIG. 13, a display device 1d includes a polarizer substrate 10k, the active element T, the pixel electrode PE, a substrate 200, the color filter element 210, the black matrix 220, the passivation layer 230, the polarizer 240, the display medium 30 and the backlight module 40. The polarizer substrate 10d is located between the substrate 200 and the backlight module 40.

The polarizer substrate 10k includes the substrate 100, the reflective layer 110', the metal pattern layer 120' and the first planar layer PL1'.

The reflective layer 110' is located on the substrate 100 and has the transmission area TA and the reflective area RA. The first planar layer PL1' is located on the substrate 100 and overlaps the transmission area TA. The metal pattern layer 120' is located on the reflective layer 110' and the first planar layer PL1'. In this embodiment, the reflective layer 110', the metal pattern layer 120' and the first planar layer PL1' are located on the first surface 100a of the substrate 100. The metal pattern layer 120' includes a polarizer structure 122 and a microstructure 124. The polarizer structure 122 includes a plurality of grid lines L1 overlapping the transmission area TA. The microstructure 124 includes the strip structures L2 overlapping the reflective area RA.

Although the microstructure 124 includes the rectangular strip structures L2 in this embodiment, the invention is not limited thereto. The microstructure 124 may also be in the form of any of the foregoing embodiments.

The active element T and the pixel electrode PE are located on the substrate 100. In this embodiment, the active element T and the pixel electrode PE are located on the second surface 100b of the substrate 100. Here, the second surface 100b is opposite to the first surface 100a. The active element T overlaps the reflective area RA and the pixel electrode PE overlaps the transmission area TA. The active element T includes a gate G, a channel layer CH, a source S and a drain D. The gate G overlaps the channel layer CH, and a gate insulation layer GI is interposed between the gate G and the channel CH. The gate G is electrically connected to a scan line (not illustrated). The source S and the drain D are electrically connected to the channel layer CH. The source S is electrically connected to a data line (not illustrated). The drain D is electrically connected to the pixel electrode PE.

Although the active element T is a bottom gate type thin film transistor in this embodiment, the invention is not limited thereto. In other embodiments, the active element T may also be a top gate type thin film transistor or other appropriate active elements.

The display medium 30 is located between the polarizer substrate 10d and the substrate 200. The display medium 30 includes, for example, liquid crystal molecules.

The color filter element 210, the black matrix 220 and the passivation layer 230 are located on a first surface 200a of the substrate 200. The black matrix 220 overlaps the reflective area RA, and the color filter element 210 overlaps the transmission area TA. The passivation layer 230 covers the color filter element 210 and the black matrix 220. The polarizer 240 is located on a second surface 200b of the substrate 200. Here, the second surface 200b is opposite to the first surface 200a. In some embodiments, a transmission axis of the polarizer 240 is perpendicular or parallel to a transmission axis of the polarizer structure 122. The polarizer 240 includes, for example, a polyvinyl alcohol (PVA) polarizing film, a triacetate cellulose film (TAC) polarizing film, an advanced polarization conversion film (APCF), a reflective dual brightness enhancement film (DBEF) or other polarizer structures. In some embodiments, the polarizer 240 may also include a wire-grid polarizer structure.

The backlight module 40 may be a direct lit backlight module, an edge lit backlight module or other types of light sources. In this embodiment, the backlight module 40 emits the unpolarized light, and the P wave in the unpolarized light will pass through the polarizer structure 122 while the S wave is reflected by the polarizer structure 122. The light ray reflected by the polarizer structure 122 will be reflected again by the backlight module 40. Here, a part of the light ray reflected into the reflective area RA will be reflected by the microstructure 124, a part of the light ray reflected by the microstructure 124 will re-enter the transmission area TA, and a part of the S wave will return to a polarized light after being reflected and/or scattered by the microstructure 124 and/or the backlight module 40. Accordingly, the light passing through the polarizer structure 122 is increased so that the brightness of the display device 1d is also increased.

Based on the above, since the metal pattern layer 110' of the polarizer substrate 10k includes the polarizer structure 122 and the microstructure 124, the brightness of the display device 1d can be increased.

Figure 14:
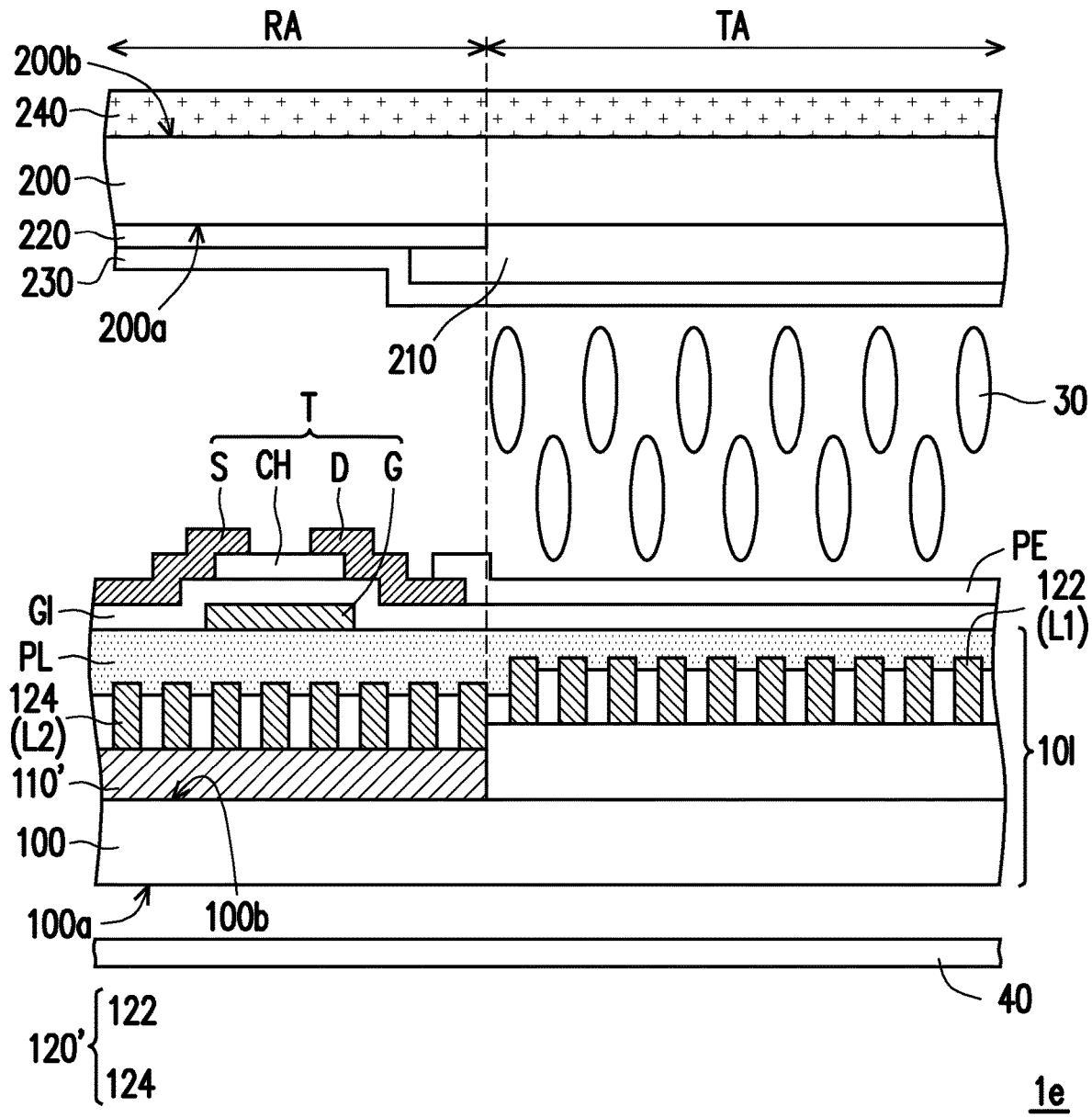
FIG. 14 is a cross-sectional view of a display device in an embodiment of the invention.

FIG. 14 is a cross-sectional view of a display device in an embodiment of the invention. It should be noted that the reference numerals and a part of the contents in the embodiment of FIG. 13 are also used to describe the embodiment of FIG. 14, in which the same reference numerals are used to represent identical or similar elements, and thus descriptions of the same technical contents are omitted. For the description of the omitted parts, reference may be made to the foregoing embodiments, which will not be repeated here.

The main difference between a display device 1e of FIG. 14 and the display device 1d of FIG. 13 is that the reflective layer 110', the metal pattern layer 120' and the first planar layer PL1' of the display device 1e are located on the second surface 100b of the substrate 100.

In this embodiment, a polarizer substrate 10l further includes the planar layer PL. The planar layer PL is disposed on the metal pattern layer 120'. In this embodiment, a part of the planar layer PL fills in a gap between the grid lines L1 and a gap between the strip structures L2. However, the invention is not limited in this regard.

In this embodiment, the active element T and the pixel electrode PE are located on the second surface 100b of the substrate 100. The active element T and the pixel electrode PE are located on the planar layer PL. By setting the planar layer PL, the active element T may be prevented from being directly formed on the uneven metal pattern layer 120', so that a process yield rate of the active element T can be improved.

Based on the above, since the metal pattern layer 110' of the polarizer substrate 10l includes the polarizer structure 122 and the microstructure 124, the brightness of the display device 1e can be increased.

Figure 15:
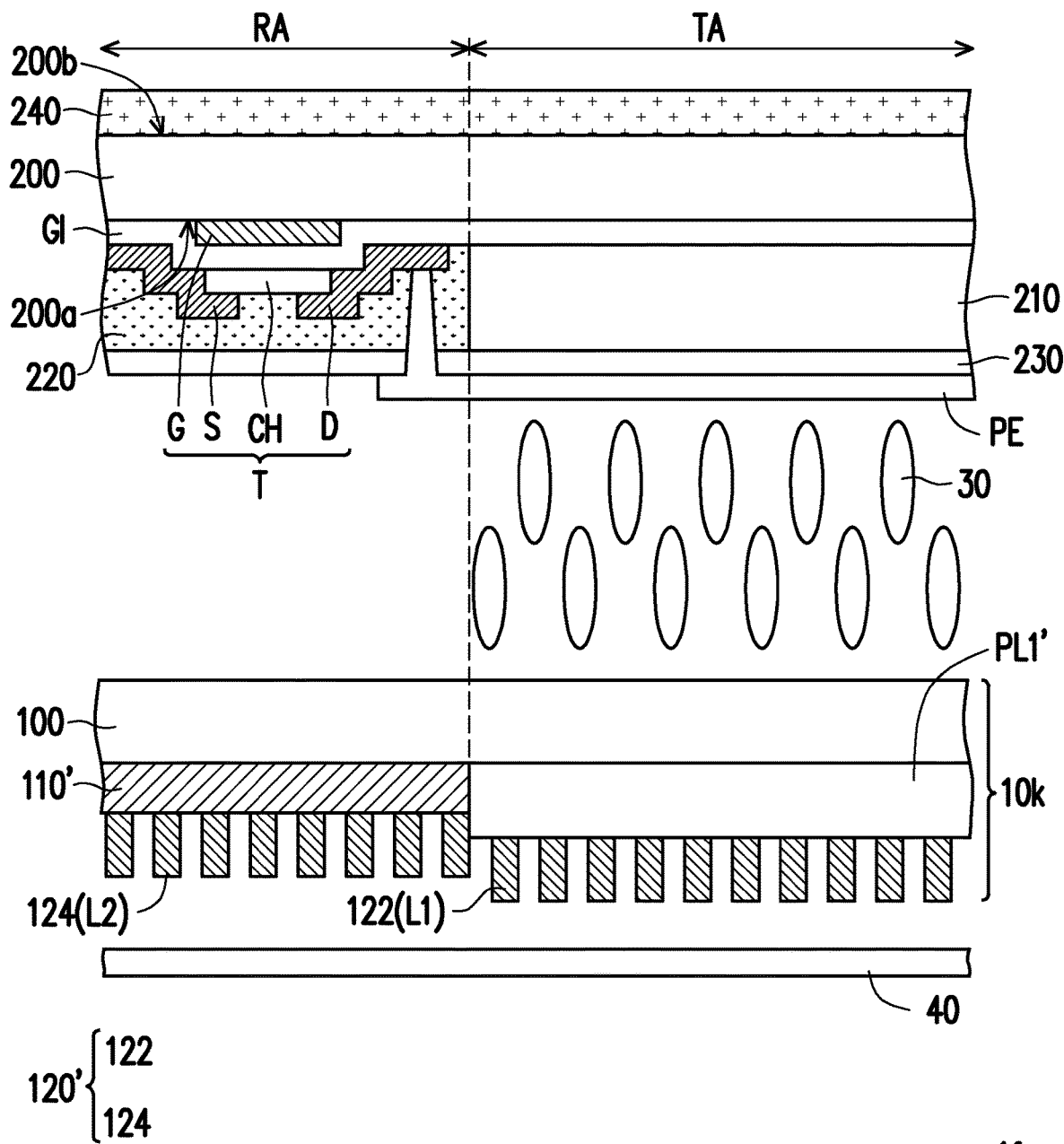
FIG. 15 is a cross-sectional view of a display device in an embodiment of the invention.

FIG. 15 is a cross-sectional view of a display device in an embodiment of the invention. It should be noted that the reference numerals and a part of the contents in the embodiment of FIG. 13 are also used to describe the embodiment of FIG. 15, in which the same reference numerals are used to represent identical or similar elements, and thus descriptions of the same technical contents are omitted. For the description of the omitted parts, reference may be made to the foregoing embodiments, which will not be repeated here.

The main difference between a display device 1f of FIG. 15 and the display device 1d of FIG. 13 is that the active element T and the pixel electrode PE of the display device 1f are located on the second surface 200b of the substrate 200.

The black matrix 220 overlaps the active element T. The pixel electrode PE is located on the passivation layer 230, and electrically connected to the active element T through an opening penetrating through the passivation layer 230 and the black matrix 220.

Figure 16:
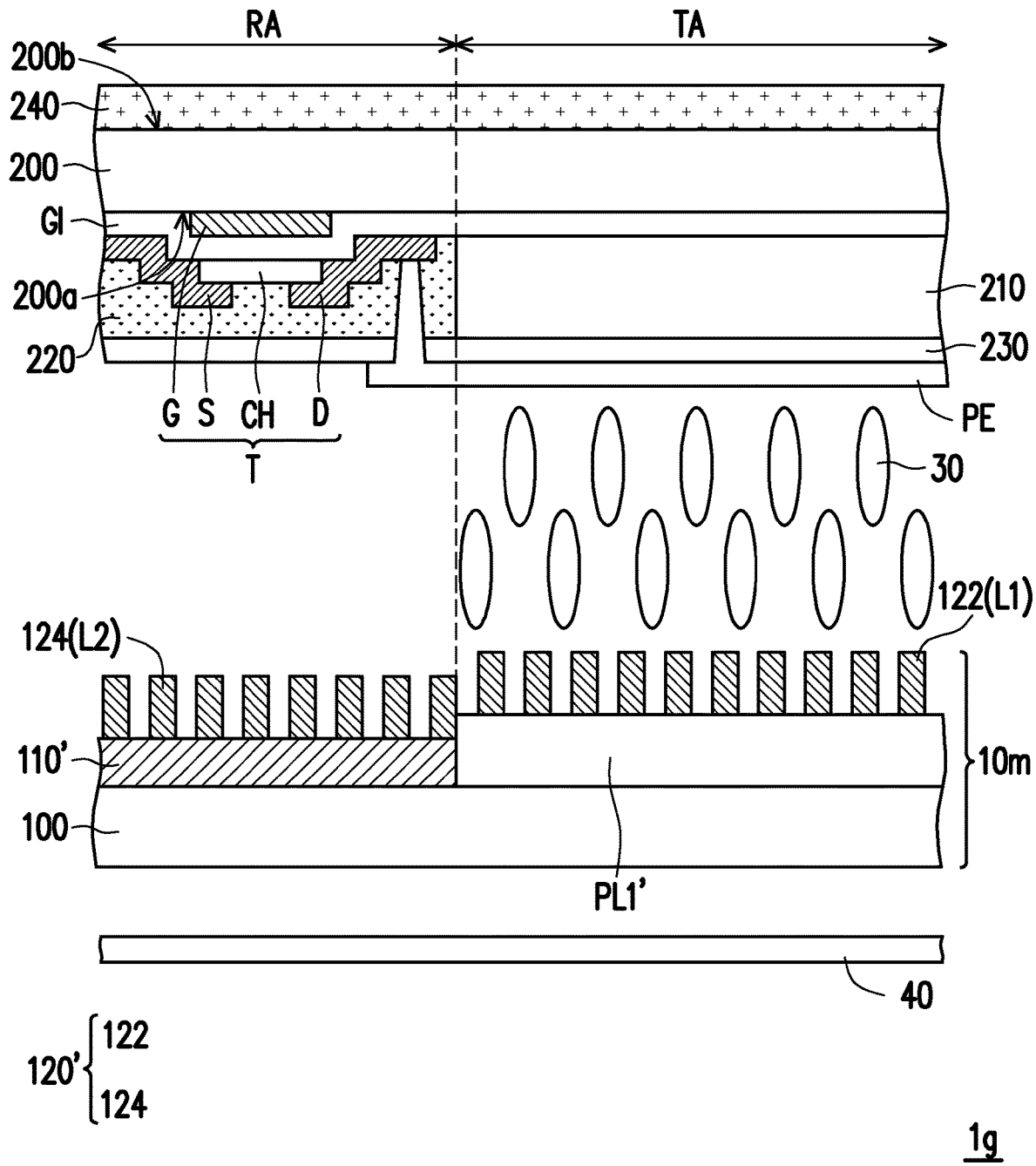
FIG. 16 is a cross-sectional view of a display device in an embodiment of the invention.

FIG. 16 is a cross-sectional view of a display device in an embodiment of the invention. It should be noted that the reference numerals and a part of the contents in the embodiment of FIG. 15 are also used to describe the embodiment of FIG. 16, in which the same reference numerals are used to represent identical or similar elements, and thus descriptions of the same technical contents are omitted. For the description of the omitted parts, reference may be made to the foregoing embodiments, which will not be repeated here.

The main difference between a display device 1g of FIG. 16 and the display device 1f of FIG. 15 is that the reflective layer 110', the metal pattern layer 120' and the first planar layer PL1' of a polarizer substrate 10m of the display device 1g are located on the second surface 100b of the substrate 100.

In summary, since the metal pattern layer of the polarizer substrate includes the polarizer structure and the microstructure, the brightness of the display device 1e can be increased.

The invention claimed is:

1. A polarizer substrate, comprising:
   a substrate;
   a reflective layer, located on the substrate, the reflective layer having a transmission area and a reflective area; and
   a metal pattern layer, located on the reflective layer and the substrate, and comprising:
      a polarizer structure, comprising a plurality of grid lines overlapping the transmission area, wherein a thickness of each of the grid lines is 200 nm to 500 nm, a width of each of the grid lines is 30 nm to 70 nm, and a distance between each adjacent two of the grid lines is 30 nm to 70 nm; and
      a microstructure, overlapping the reflective area, the microstructure having a thickness of 20 nm to 500 nm.

2. The polarizer substrate of claim 1, wherein the microstructure comprises a plurality of strip structures.

3. The polarizer substrate of claim 2, wherein a width of each of the stripe structures closer to the substrate is wider, and the width of each of the grid line closer to the substrate is wider.

4. The polarizer substrate of claim 2, wherein the metal pattern layer comprises:
   an extension layer, located on the reflective layer, wherein the strip structures are directly connected on the extension layer.

5. The polarizer substrate of claim 1, wherein the microstructure is directly connected on the reflective layer.

6. The polarizer substrate of claim 1, further comprising a first planar layer, located in the transmission area, the polarizer structure overlapping the first planar layer.

7. The polarizer substrate of claim 6, wherein a thickness of the first planar layer is 40 nm to 140 nm, and a thickness of the reflective layer is 40 nm to 100 nm.

8. The polarizer substrate of claim 6, further comprising a second planar layer, covering the reflective layer and the first planar layer, wherein the polarizer structure and the microstructure are directly connected on the second planar layer.

9. The polarizer substrate of claim 6, wherein the first planar layer is further located between the substrate and the reflective layer.

10. The polarizer substrate of claim 1, wherein the thicknesses of the grid lines are greater than the thickness of the microstructure.

11. A manufacturing method of a polarizer substrate, comprising:
    forming a reflective layer on a substrate, wherein the reflective layer has a transmission area and a reflective area;
       forming a metal material layer overlapping the reflective area and the transmission area; and
       patterning the metal material layer to form a metal pattern layer, wherein the metal pattern layer comprises:
          a polarizer structure, comprising a plurality of grid lines overlapping the transmission area, wherein a thickness of each of the grid lines is 200 nm to 500 nm, a width of each of the grid lines is 30 nm to 70 nm, and a distance between each adjacent two of the grid lines is 30 nm to 70 nm; and
          a microstructure, overlapping the reflective area, the microstructure having a thickness of 20 nm to 500 nm.

12. The manufacturing method of the polarizer substrate of claim 11, further comprising:
    forming a first planar material layer on the substrate;
    forming a mask pattern on the first planar material layer;
    patterning the first planar material layer with the mask pattern as a mask to form a first planar layer;
    forming a reflective material layer to cover the mask pattern and the substrate; and
    removing the mask pattern and a part of the reflective material layer located on the mask pattern to form the reflective layer.

13. The manufacturing method of the polarizer substrate of claim 12, wherein a material of the mask pattern comprises a photoresistor, and a method for removing the mask pattern and the part of the reflective material layer located on the mask pattern comprises a lift-off method.

14. The manufacturing method of the polarizer substrate of claim 12, further comprising:
    forming a second planar layer to cover the reflective layer and the first planar layer, the second planar layer overlapping the reflective area and the transmission area; and
    forming the metal material layer on the second planar layer.

15. The manufacturing method of the polarizer substrate of claim 11, further comprising:
    forming a first planar material layer on the substrate;
    forming a first mask pattern on the first planar material layer by a half-tone mask process;
    patterning the first planar material layer with the first mask pattern as a mask to form a first planar layer;
    forming a second mask pattern on the first planar material layer;
    forming a reflective material layer to cover the second mask pattern and the first planar layer; and
    removing the second mask pattern and a part of the reflective material layer located on the second mask pattern to form the reflective layer.

16. The manufacturing method of the polarizer substrate of claim 11, wherein a method for patterning the metal material layer comprises:
    forming a photoresist material on the metal material layer;
    patterning the photoresist material by an imprinting process to form a plurality of strip photoresists, wherein a part of the strip photoresists overlaps the reflective area, and another part of the strip photoresists overlaps the transmission area; and
    etching the metal material layer with the strip photoresists as a mask to form the metal pattern layer.

17. The manufacturing method of the polarizer substrate of claim 16, wherein a height of the part of the strip photoresists overlapping the reflective area is different from a height of the another part of the strip photoresists overlapping the transmission area.

\* \* \* \* \*